(12) United States Patent
Zylstra et al.

(10) Patent No.: US 12,437,389 B2
(45) Date of Patent: Oct. 7, 2025

(54) VEHICLE DAMAGE DETECTION SYSTEM AND METHOD

(71) Applicant: 2872475 Ontario Limited, Richmond Hill (CA)

(72) Inventors: Philip Zylstra, Port Stanley (CA); Matthew James Gibson, Stouffville (CA)

( * ) Notice: Subject to any disclaimer, the term of this patent is extended or adjusted under 35 U.S.C. 154(b) by 144 days.

(21) Appl. No.: 18/554,181

(22) PCT Filed: Apr. 25, 2022

(86) PCT No.: PCT/CA2022/050631
§ 371 (c)(1),
(2) Date: Oct. 5, 2023

(87) PCT Pub. No.: WO2022/226636
PCT Pub. Date: Nov. 3, 2022

(65) Prior Publication Data
US 2024/0257335 A1 Aug. 1, 2024

Related U.S. Application Data

(60) Provisional application No. 63/280,352, filed on Nov. 17, 2021, provisional application No. 63/179,575, filed on Apr. 26, 2021.

(51) Int. Cl.
*G06T 7/00* (2017.01)
*B60S 5/00* (2006.01)
*G06T 17/00* (2006.01)

(52) U.S. Cl.
CPC .............. *G06T 7/001* (2013.01); *G06T 17/00* (2013.01); *B60S 5/00* (2013.01); *G06T 2200/24* (2013.01);

(Continued)

(58) Field of Classification Search
None
See application file for complete search history.

(56) References Cited

U.S. PATENT DOCUMENTS

| 8,515,152 B2 | 8/2013 | Siri |
| 8,756,085 B1 | 6/2014 | Plummer et al. |

(Continued)

FOREIGN PATENT DOCUMENTS

| CA | 2911765 | 3/2018 |
| CA | 3004572 A1 | 11/2018 |

(Continued)

OTHER PUBLICATIONS

H. S. Park and U. M. Tuladhar, International Journal of Automotive Technology, vol. 17, No. 1, pp. 119-126 (2016).

*Primary Examiner* — Frank S Chen

(57) ABSTRACT

A vehicle damage detection system operating on a computer system for evaluating specific damage to a vehicle. The vehicle damage detection system capturing a 3D point cloud of a damaged vehicle with a 3D scanner and identifies one or more sites of vehicle damage based on comparison of the captured 3D point cloud of the damaged vehicle to a baseline 3D file by identifying points within the 3D point cloud of the damaged vehicle that deviate from an original equipment manufacturer (OEM) standard vehicle of the same type. The damage detection system can be used to determine and identify replacement parts and components and generate an estimate and parts list based on previously damaged vehicles having a similar damage pattern, allowing an improved method for vehicle damage assessment and repair.

20 Claims, 20 Drawing Sheets

(52) U.S. Cl.
CPC ............... *G06T 2207/10024* (2013.01); *G06T 2207/10028* (2013.01); *G06T 2207/20084* (2013.01); *G06T 2207/30108* (2013.01); *G06T 2210/56* (2013.01)

(56) References Cited

U.S. PATENT DOCUMENTS

| | | | |
|---|---|---|---|
| 9,080,866 B1 | 7/2015 | Dowdall et al. | |
| 9,218,626 B1 | 12/2015 | Haller, Jr. et al. | |
| 9,721,304 B1 | 8/2017 | Parchment et al. | |
| 9,824,453 B1 | 11/2017 | Collins et al. | |
| 9,886,771 B1 | 2/2018 | Chen et al. | |
| 9,978,105 B1 | 5/2018 | Parchment et al. | |
| 10,152,836 B2 | 12/2018 | Rozint | |
| 10,319,094 B1 | 6/2019 | Chen et al. | |
| 10,430,885 B1 | 10/2019 | Brandmaier et al. | |
| 10,573,012 B1* | 2/2020 | Collins | G06F 18/40 |
| 10,636,148 B1 | 4/2020 | Chen et al. | |
| 10,699,168 B1 | 6/2020 | Xu | |
| 10,740,891 B1 | 8/2020 | Chen et al. | |
| 10,832,065 B1 | 11/2020 | Lambert et al. | |
| 10,976,262 B2 | 4/2021 | Ozim | |
| 11,087,138 B2 | 8/2021 | Guo | |
| 11,144,889 B2 | 10/2021 | Li et al. | |
| 2009/0160852 A1* | 6/2009 | Chang | G06T 7/0004 345/419 |
| 2017/0186094 A1 | 6/2017 | Plummer et al. | |
| 2017/0227645 A1 | 8/2017 | Swope et al. | |
| 2018/0293552 A1 | 10/2018 | Zhang et al. | |
| 2019/0258225 A1* | 8/2019 | Link | G06T 7/70 |
| 2020/0104805 A1 | 4/2020 | Gulati et al. | |
| 2020/0269820 A1 | 8/2020 | Lin | |
| 2020/0317165 A1 | 10/2020 | Watts et al. | |
| 2021/0141064 A1* | 5/2021 | Wohlgenannt | G01S 17/42 |

FOREIGN PATENT DOCUMENTS

| | | |
|---|---|---|
| DE | 102018218611 A1 | 4/2020 |
| GB | 2505106 A | 2/2014 |

\* cited by examiner

Damaged area

Area of vehicle damage

VEHICLE DAMAGE DETECTION SYSTEM AND METHOD

CROSS-REFERENCE TO RELATED APPLICATIONS

This application claims priority to United States provisional patent applications U.S. 63/179,575 filed on 26 Apr. 2021 and U.S. 63/280,352 filed on 17 Nov. 2021, and is a United States National Stage application under 35 U.S.C. 371 of PCT Application No. PCT/CA2022/050631 filed on 25 Apr. 2022, all of which are hereby incorporated by reference herein in their entirety.

FIELD OF THE INVENTION

The present invention pertains to the assessment of the extent of structural damage in a vehicle using 3D point cloud capture and analysis. The present invention is also directed to using and comparing a damaged vehicle point cloud to a vehicle standard to provide a repair protocol, repair estimate, and/or repair assessment to a technician for estimating and/or repairing the damage.

BACKGROUND

Collisions to vehicles such as cars, trucks, and sport utility vehicles often result in misalignment damage to the frame or body structure of the vehicle. Vehicles that have been involved in a collision often incur structural and component damage to various areas and components. Anytime a vehicle has been damaged structurally it needs to be realigned back to Original Equipment Manufacturer (OEM) specifications in order to deem it repaired and safe for use on the road. In order to do this, the vehicle must be measured first to assess the extent of the damage, and remeasured again after the repair has been done to assess its structural proximity to the OEM standard specifications. In order for the damaged vehicle to accurately be assessed for physical damage and monetary costs for repair, all aspects of damage need to be measured and documented, including which components and parts need to be ordered and replaced and the processes of how the vehicle is to be repaired.

The nature and extent of misalignment damage or realignment during or after repair can be determined in a number of ways, for example by direct measurement using mechanical, electrical, and optical measuring tools such as three-dimensional (3D) laser or optical camera measuring systems. Current systems for measuring and assessing vehicles often employ 2D probe measurements that can be inaccurate with variation introduced by the user of the measuring device. A probe measuring system is designed to measure a limited number of predetermined points of a vehicle frame, thus limiting the systems to certain points of deviations in 2D and not allowing the system to accurately capture all aspects of damage to each vehicle. Furthermore, these systems cannot accurately represent post repair quality control of all aspects of the repair as they are design for particular and limited components measurements.

Vehicle damage assessment tools can provide estimates for insurance claims. In one example, U.S. Pat. No. 10,430,885B1 to Brandmaier et al. describes a system and method for analyzing damage and processing claims associated with an insured vehicle by identifying one or more edges surrounding a plurality of damaged areas of the insured vehicle by applying one or more edge filters to captured image data. In another example, U.S. Pat. No. 10,152,836B2 to Rozint provides an automotive collision repair technology including a diagnostic scan tool and a processor to run diagnostics and perform collision repair operations such as recalibration to the vehicle electronics system.

Typical measuring systems are done in 3D with a probe system, such as the Car-o-liner® vision system. These probe systems are used by inserting a laser probe into one of a few specific locations in the vehicle frame as indicated in a two dimensional (2D) vehicle map shown on a display screen. The system displays the vehicle map to a technician and the technician will identify which location the probe is measuring. A measurement is then taken by the probe by pressing the capture button at the specified predetermined location as indicated. The probe system connects to a computer wirelessly via bluetooth and the measurements are compared to a data set in a software having the OEM standard measurements for the same vehicle type. The results are then displayed on the 2D vehicle map as a measurement of the deviation distance from the standard, where higher numbers are indicative of more deviation and therefore more damage. In this way collected data identifies how far from the OEM standard the probe measurements are at the predetermined location. In order to make the system useful the user must find three undamaged points of reference of the vehicle to center the measuring probe to the vehicle, essentially creating a field of reference so that the probe system can create a map for localization. In order to get a comparative measuring data set, the user must measure only at specific and predetermined measuring points as identified by the system that the measuring system manufacturer has premeasured in their facility.

In current processes for assessing a damaged vehicle, preparing an estimate, and submitting a detailed report of repair costs and times for a vehicle damage repair, estimating processes are generally created by manual entering of information by the technician. Case estimates can also be completed using an estimating software designed for the collision repair industry. This software can assist the user by allowing the user to choose parts for replacement, repair and replacement times for these parts, paint or coating as well as adhesive application and dry times, and costs for repairing, replacing, and painting parts. The estimating software will suggest a monetary value for any function that needs to be performed on the vehicle for repair based on the functions the technician chooses within the software. Creating an accurate estimate for repair of a damaged vehicle takes technician time even before the vehicle owner and insurance company have agreed to the repair. If the repair is not authorized, the automotive shop generally cannot recoup the time spent or monetize the work. Additionally, automotive shops prefer to provide estimates that are as accurate as possible as vehicle owners and insurance company will often refuse to pay over the estimate if additional work that was not agreed to before the repair is required. However, unanticipated work often comes up during the repair process.

There remains a need for a flexible and fast vehicle imaging and repair assessment system that can assess structural damage to a vehicle and provide an accurate assessment and estimate of repair requirements and/or a protocol for damage repair. There also remains a need for a flexible vehicle visioning system that can assess structural aspects of damage to a vehicle and provide a protocol for damage repair and/or parts ordering based on the specific damage done to the specific vehicle being assessed. There also remains a need for a machine learning or artificial intelligence assessment system for preparing assessments on vehicle repair and estimations of damages that can automatically assign a monetary value or cost for repair that is based on structural measured and angular deviations of the vehicle structural system.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a vehicle imaging, assessment, and repair system that can assess structural damage in a vehicle.

In an aspect there is provided a computer-implemented method for assessing damage to a vehicle, the method comprising: capturing a 3D point cloud of a damaged vehicle and its damaged components with a 3D scanner; comparing the 3D point cloud of the damaged vehicle to a baseline 3D file of an original equipment manufacturer (OEM) standard vehicle of the same type; identifying a site of vehicle damage on the damaged vehicle based on the comparison of the captured 3D point cloud of the damaged vehicle to the baseline 3D file by identifying a set of deviating points within the 3D point cloud of the damaged vehicle that deviate from the baseline 3D file of the OEM standard vehicle; quantifying the deviation of the identified set of deviating points on a x,y,z, plot based on location of points in the 3D point cloud of the damaged vehicle at the site of vehicle damage compared to the OEM standard; and displaying, on a user interface, an image overlay of the captured 3D point cloud of the damaged vehicle and the baseline 3D OEM standard vehicle and identifying points within the scanned point cloud of the damage vehicle that are beyond a predetermined threshold of deviation from the OEM standard vehicle.

In an embodiment, the baseline 3D file of the OEM vehicle of the same type is a point cloud file.

In another embodiment, the 3D scanner uses LASER triangulation 3D scanning technology, structured light 3D scanning technology, modulated light 3D scanning technology, contact-based 3D scanning technology, LASER pulse-based 3D scanning technology, time-of-flight 3D laser scanning technology, or laser-based 3D scanning technology.

In another embodiment, the 3D point cloud of the damaged vehicle is accurate to less than about 2 mm.

In another embodiment, the method further comprises matching the identified site of vehicle damage to a previously damaged vehicle in a damaged vehicle database and importing at least one of a repair estimate and a repair procedure for the previously damaged vehicle.

In another embodiment, the repair estimate comprises a listing of one or more parts for replacement, part repair labor time, part replacement labor time, paint cost, coating cost, refinishing labor time, paint or coating dry time, disposal cost, and administrative cost.

In another embodiment, comparing the captured 3D composite file of the damaged vehicle and the baseline 3D composite file is executed by one or more convoluted neural network connected to a processing system.

In another embodiment, comparing the captured vehicle 3D point cloud to a baseline 3D file of an original equipment manufacturer (OEM) standard vehicle of the same type uses a Nearest Neighbor (NN) algorithm or a Nearest Neighbor Distance Ratio (NNDR) algorithm.

In another embodiment, comparing the 3D point cloud of the damaged vehicle and the baseline 3D file capture at least one of curvature, smoothness, and geometrical edge similarities.

In another embodiment, comparing the 3D point cloud of the damaged vehicle to a baseline 3D file comprises matching the damaged vehicle and baseline vehicle by one or more of vehicle model, vehicle year, vehicle make, and vehicle features.

In another embodiment, the 3D point cloud of the damaged vehicle is displayed in a first color and the baseline 3D file of OEM standard vehicle in a second color.

In another embodiment, displaying the image overlay comprises displaying the set of differentiating points and deviation distance on the x,y,z, plot.

In another embodiment, the method further comprises displaying the image overlay as a heatmap, where each color represents a varying degree of deviation of the 3D point cloud of the damaged vehicle to the baseline 3D file of the OEM standard vehicle.

In another aspect there is provided a system for isolating vehicle damage on a damaged vehicle comprising: a 3D scanner capable of capturing a point cloud of a damaged vehicle and its components to provide a 3D point cloud image of the damaged vehicle; an original equipment manufacturer (OEM) vehicle database comprising a plurality of baseline 3D files of undamaged vehicles identified by vehicle model, vehicle year, and vehicle make; a processor for storing and processing information relating to the 3D point cloud of the damaged vehicle and baseline 3D file to: compare the captured vehicle 3D point cloud of the damaged vehicle to a baseline 3D file of an OEM standard vehicle of the same vehicle model, vehicle year, and vehicle make from the OEM vehicle database; identify, based on the compared 3D point cloud of the damaged vehicle to the baseline 3D file of the OEM standard vehicle, a plurality of differentiating points between the 3D point cloud of the damaged vehicle and the baseline 3D file of the OEM standard vehicle; quantify the deviation of the identified set of deviating points on a x,y,z, plot based on location in of points in the 3D point cloud of the damaged vehicle at the site of vehicle damage compared to the OEM standard; and overlay the captured 3D point cloud of the damaged vehicle and the baseline 3D file to create an image overlay; and a graphical user interface for displaying the image overlay of the 3D point cloud of the damaged vehicle and the baseline 3D file and deviating points within the scanned point cloud of the damage vehicle that are beyond a predetermined threshold of deviation from the OEM standard.

In an embodiment, the processor allows the image overlay on the user interface to be manipulated in 360 degrees and zoomed in and out.

In another embodiment, the system further comprises a parts database comprising a parts list mapped to particular areas of damage on the damaged vehicle, and wherein the processor generates a parts list for repairing the damaged vehicle.

In another embodiment, the system further comprises a damaged vehicle database, wherein the processor matches the 3D point cloud of the damaged vehicle to a previously damaged vehicle of the same type, the damaged vehicle database comprising at least one of a repair estimate and a repair procedure for the previously damaged vehicle.

In another embodiment, the graphical user interface allows selection of specific points on each of the 3D point cloud of the damaged vehicle and the baseline 3D file to isolate a measured and angular difference of the specific points.

In another embodiment, the 3D scanner is one or more of a LASER triangulation 3D scanner, structured light 3D scanner, time-of-flight 3D laser scanner, modulated light 3D scanner, contact-based 3D scanner, LASER pulse-based 3D scanner, and other laser-based 3D scanner.

In another embodiment, the predetermined threshold of difference is less than about 2 mm.

In another aspect there is provided a computer implemented method for assessing damage to a vehicle, the method comprising: capturing a 3D point cloud composite shape with a 3D scanner representing a damaged vehicle and its components; comparing the captured vehicle shape composite file to an archived point cloud baseline 3D composite file of an undamaged vehicle of the same type; overlaying the captured 3D composite file of the damaged vehicle and the baseline 3D composite file; identifying, based on the comparison of the captured 3D composite file to the baseline 3D composite file, differentiating points within each point cloud between the two composite files; associating the identified set of differentiating points with an extent of damage; quantifying the differentiating points as having angular differences and measured relationships on an x,y,z, plot; and displaying, on a user interface, an image overlay of the captured 3D point cloud composite shape of the damaged vehicle and the archived baseline 3D composite shape represented by calculating the differences of points within the point clouds and ascertaining points within the scanned point cloud shapes of the damage vehicle that are beyond a predetermined threshold of difference.

In an embodiment, the baseline 3D composite file identifies a plurality of vehicle components and overlays the identified vehicle components onto the captured 3D composite file.

In another embodiment, the 3D scanner uses LASER triangulation 3D scanning technology, structured light 3D scanning technology, modulated light 3D scanning technology, contact-based 3D scanning technology, LASER pulse-based 3D scanning technology, time-of-flight 3D laser scanning, or other laser-based 3D scanning technology.

In another embodiment, the captured damaged vehicle shape corresponds to a point cluster identified from the 3D point cloud, forming a shape directly representative of the damaged vehicle and accurate to greater than 2 mm.

In another embodiment, the 3D point cloud composite shape of the damaged vehicle captures a damaged area on the vehicle.

In another embodiment, overlaying the captured 3D composite file of the damaged vehicle and the baseline 3D composite file is executed by a plurality of convoluted neural networks connected to a processing system.

In another embodiment, the points of the scanned point cloud shape of the damaged vehicle that are deemed to be greater than the determined threshold set by the system are considered a damaged area of the point cloud cluster.

In another embodiment, the differentiating points are quantified at an accuracy of less than 2 mm of difference between the captured 3D composite file of the damaged vehicle and the baseline 3D composite file.

In another embodiment, the 3D point cloud composite shape and the baseline 3D composite file capture at least one of curvature, smoothness, and geometrical edge similarities.

In another embodiment, the 3D point cloud composite shape of the damaged vehicle is compared to a database of baseline 3D composite file to identify the damaged vehicle by one or more of vehicle model, vehicle year, vehicle make, and vehicle features.

In another embodiment, the captured 3D point cloud composite shape of the damaged vehicle is displayed in a first color and the archived baseline 3D composite shape in a second color.

In another embodiment, displaying the image overlay comprises displaying the set of differentiating points and quantitative angular differences and measured relationships on the x,y,z, plot.

In another embodiment, associating the identified set of differentiating points with the extent of damage comprises selecting one or more sets of differentiating points to form a cluster of differentiating points from the captured 3D composite file and the baseline 3D composite file.

In another aspect there is provided a system for isolating vehicle damage on a damaged vehicle comprising: a 3D scanner capable of capturing a point cloud cluster of a damaged vehicle and its components to form a point cloud shape representative of the damaged vehicle; a vehicle database comprising a plurality of point cloud baseline 3D composite files of undamaged vehicles; a processor for storing and processing information relating to the 3D composite shapes of point cloud files representing the undamaged vehicle and 3D composite baseline files, and when executed cause the one or more processors to: compare the captured vehicle shape composite file to an archived point cloud baseline 3D composite file of an undamaged vehicle of the same type; overlay the captured 3D composite file of the damaged vehicle and the baseline 3D composite file; identify, based on the comparison of the captured 3D composite file to the baseline 3D composite file, differentiating points within each point cloud between the two composite files; and associate the identified set of differentiating points with an extent of damage; quantify the differentiating points as having angular differences and measured relationships on an x,y,z, plot; and a graphical user interface for displaying an image overlay of the captured 3D point cloud composite shape of the damaged vehicle and the archived baseline 3D composite shape represented by calculating the differences of points within the point clouds and ascertaining points within the scanned point cloud shapes of the damage vehicle that are beyond a predetermined threshold of difference.

In an embodiment, the processor allows the image overlay on the user interface to be manipulated in 360 degrees and zoomed in and out.

In another embodiment the system further comprises a parts database comprising a parts list mapped to particular areas of damage on the vehicle, for vehicle parts and component ordering.

In another embodiment, the parts list is a complete parts list of a damaged area on the damaged vehicle, and a list of specific parts can be selected from the generated parts list to isolate to an ordering system.

In another embodiment, the list of specific parts selected are stored in the parts database based on one or more of the vehicle year, make, model, and specific differentiating angular and measured values of damage associated with the particular differences of point cloud clusters of damage between the captured 3D point cloud composite shape and the baseline composite file.

In another embodiment, the graphical user interface allows selection of specific points on each of the captured 3D point cloud composite shape of the damaged vehicle and the archived baseline 3D composite shape to isolate a measured and angular difference of the specific points.

In another embodiment, the specific points of the 3D scanned point cloud shape of the damaged file are compared against the same specific point of the 3D composite baseline file and labeled in the displayed image overlay on the graphical user interface.

In another embodiment, the 3D scanner is one or more of a LASER triangulation 3D scanner, structured light 3D scanner, contact-based 3D scanner, time-of-flight 3D laser scanner, modulated light 3D scanner, LASER pulse-based 3D scanner, and laser-based 3D scanner.

In another embodiment, the predetermined threshold of difference is greater than about 2 mm.

In another aspect there is provided a method for isolating vehicle damage in a damaged vehicle comprising: capturing a point cloud cluster a damaged area of the damaged vehicle; capturing a point cloud cluster of an opposite undamaged side of the damaged vehicle on an undamaged side of the vehicle; in a processor, inverting the point cloud cluster of the opposite side of the damaged vehicle to obtain an inverted image of the undamaged side of the vehicle; in the processor, comparing the inverted point cloud cluster to the point cloud cluster of the damaged area of the damaged vehicle; and displaying an image overlay of the point cloud cluster of the damaged area of the damaged vehicle and the point cloud cluster of an opposite undamaged side of the damaged vehicle to indicate where the vehicle is damaged.

In an embodiment, the point cloud cluster of an area of a damaged area of the damaged vehicle is accurate to less than 2 mm relative to the damaged vehicle.

In another embodiment, the image overlay of the point cloud cluster of the damaged area of the damaged vehicle and the inverted image is done by matching at least the point clouds of each image along at least one of like geographical edge profiles, smoothness, and texture.

In another aspect there is provided a method for vehicle damage assessment and repair comprising: capturing a three dimensional (3D) dataset of a damaged vehicle; comparing the 3D dataset of a damaged vehicle to a vehicle standard of the same type; graphically displaying the 3D dataset of a damaged vehicle to the vehicle standard; identifying a location of damage on the damaged vehicle compared to the vehicle standard; and indicating a tool anchoring location on the graphical display of the 3D dataset of the damaged vehicle to repair the vehicle.

In an embodiment, the method further comprises providing a protocol for repairing the vehicle.

In another embodiment, the protocol for repairing the vehicle provides one or more angular realignment, applied force, or applied force profile, for applying force at the tool anchoring location.

In another embodiment, applying force at the tool anchoring location comprises applying a pulling force or applying a pushing force.

In another embodiment, the tool anchoring location is represented as an x,y,z coordinate.

In another embodiment, the method further comprises indicating a jig anchoring location for anchoring the damaged vehicle during the repair.

In another embodiment, the 3D dataset of the damaged vehicle and the vehicle standard are displayed in one or more different colour, shading, heat map, and outline.

In another embodiment, a degree of damage at the location of damage on the damaged vehicle is identified by one or more of colour, shading, heat map, and outline.

In another embodiment, capturing the three dimensional 3D dataset of a damaged vehicle comprises capturing a portion of the damaged vehicle adjacent the location of damage.

In another aspect there is provided a vehicle damage assessment and repair system comprising: an imaging system to capture a three dimensional (3D) dataset of a damaged vehicle; a vehicle database comprising a plurality of 3D datasets for a plurality of vehicle standards identified by vehicle type; an image processing system for comparing the 3D dataset of the damaged vehicle to a 3D dataset of a vehicle standard of the same type as the damaged vehicle from the vehicle database to identify one or more locations of damage on the damaged vehicle and indicate at least one tool anchoring location on the graphical display of the 3D dataset of the damaged vehicle to repair the vehicle; and a graphical user interface displaying an overlay of the 3D dataset for the damaged vehicle with a 3D standard dataset of a vehicle of the same vehicle type as the damaged vehicle with the identified one or more locations of damage on the damaged vehicle.

In another embodiment, the imaging system comprises one or more white light scanner, camera, laser, modulating light source, stable light source, light projector, and laser scanner.

In another embodiment, the imaging system uses one or more of white light scanning, time-of-flight 3D laser scanning, triangulation based 3D laser scanning, structured-light 3D scanning, modulated light 3D scanning, and stereo photogrammetry.

In another embodiment, the 3D dataset of the damaged vehicle comprises a point cloud.

In another embodiment, the image processing system determine specific information for repairing of the location of damage on the damaged vehicle.

In another embodiment, the graphical user interface indicates locations for one or more of tool anchoring, jig anchoring, and a tooling protocol for repairing of the location of damage on the damaged vehicle.

In another embodiment, the graphical user interface indicates at least one the displacement distance and angular displacement of the damaged vehicle relative to the vehicle standard.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Figure 1:
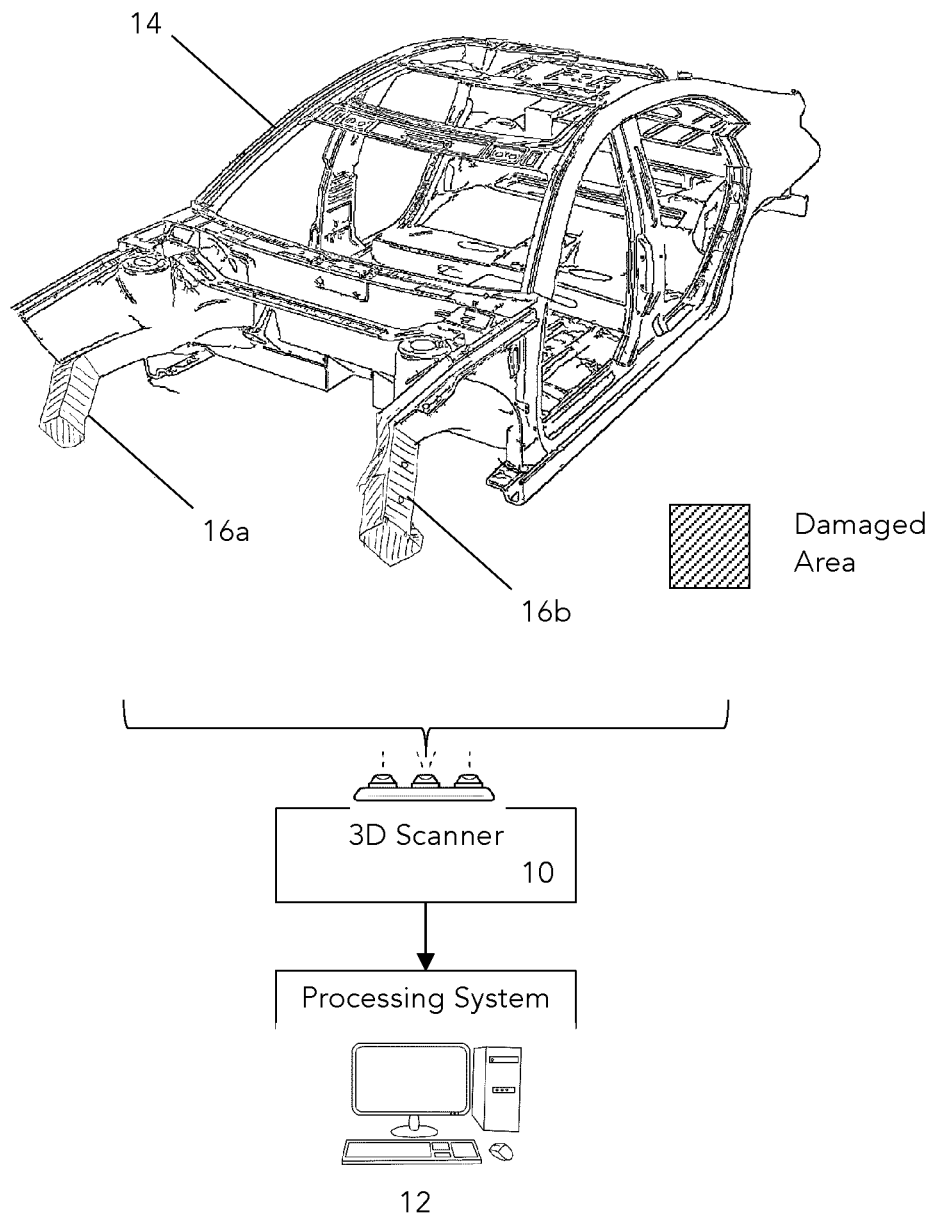
FIG. 1 is an example system for capturing 3D scan data and transferring the data to a processor.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprise" and any of its derivatives (e.g. comprises, comprising) as used in this specification is to be taken to be inclusive of features to which it refers, and is not meant to exclude the presence of any additional features unless otherwise stated or implied. The term "comprising" as used herein will also be understood to mean that the list following is non-exhaustive and may or may not include any other additional suitable items, for example one or more further feature(s), component(s) and/or element(s) as appropriate.

As used herein, the terms "comprising", "having", "including" and "containing", and grammatical variations thereof, are inclusive or open-ended and do not exclude additional, unrecited elements and/or method steps. The term "consisting of" when used herein in connection with a composition, device, article, system, use, or method, excludes the presence of additional elements and/or method steps. A composition, device, article, system, use, or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to. The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the term "vehicle type" refers to the identification of a vehicle by vehicle make, model, year, and features. By identifying the vehicle type of a damaged vehicle the damaged vehicle can be matched to a vehicle of the same vehicle type in a vehicle database that contains the original equipment manufacturer (OEM) specifications for the vehicle type.

The term "point cloud" as used herein refers to a set of data points in space. The point cloud of a vehicle provides coordinate information on components in the vehicle. The points in the point cloud represent a 3D shape or object or vehicle, or particular location thereon. Each point position has its set of Cartesian coordinates of relative x, y, and z coordinates, meaning that each coordinate is referenced relative to the other coordinates in the vehicle. The term "point cloud" as used herein can have as few as three points, however preferably has many more points to provide accurate measurement and characterization of the damaged vehicle.

Herein is provided a method and system for vehicle structural damage detection, assessment, and repair. The present system receives 3D images in the form of a point cloud from a damaged vehicle scan and compares them to a digital vehicle composite file of the same vehicle type from a vehicle database. From the point cloud comparison the present system can assess damage to the vehicle, generate parts orders, and provide estimates for repair. Damage and repair assessment using 3D scanning methods to collect a damaged vehicle point cloud and effective matching algorithms to identify other damaged vehicles for which assessment and repair estimates can provide an efficient estimating process for assessment of required work for submission to insurance companies and end user customers. The present system can also use the point cloud comparison data to generate realignment and tooling anchor points for a damaged vehicle based on a 3D image overlay of damaged and undamaged vehicle of the same type. In this way a process for realigning damaged components of a damaged vehicle can be provided to a technician for positioning and anchoring the damaged vehicle on a frame alignment and anchoring system for vehicle repair and for positioning and applying appropriate force in an appropriate direction for vehicle, part, or component realignment.

The present system and method for measuring damaged vehicles includes at least one 3D scanner to generate a point cloud shape representation of a real-world damaged vehicle. The damaged vehicle point cloud shape is a geometrical and mathematical representation of the actual physical real-world vehicle which quantified measurement of the damage it has sustained. The damaged vehicle point cloud file is stored on one or more processors connected to the 3D scanner. A baseline data file of the same vehicle type, referred to herein as the original manufacturer equipment or OEM vehicle, is stored on the same or different processor and can be compared to the point cloud shape of the damaged vehicle based on the identification of the specific make, model, and type of vehicle being assessed. An image overlay of the files can be generated based on the like geographical edge profiles, curvature, and edge profile of the various aspects of undamaged areas of each file, causing the damage and undamaged files to merge into a single file for assessment. The differentiating points of the two files are calculated by the processing system, and those points that do not match in comparison are deemed to be at the damaged areas of the vehicle. The system processor automatically attaches a quantitative difference between the differentiating points within the point cloud cluster. The one or more processors can further display a point cloud or other 3D overlay file on a graphical user interface display and allow for manipulation of the images by a technician, also referred to herein as a user, that may include moving the 3D file in different angles of view and zooming in and out for more flexibility in visual assessment. The user can also be enabled to select points or loci on each file of the image overlay to compare quantitative units of difference that can be displayed on the graphical user interface screen as a numerical value of measured distance and angular differences. These selected points can also then be labeled by the user as a specific descriptive point and saved on the processing system for reporting.

The present system and method can also be used for creating a list of parts for ordering for the completion of the repair of the damaged vehicle and used in preparing an estimate. The user can further isolate an area of the vehicle on the graphical user interface screen that they desire to order replacement parts for repair, or to limit the area of 3D scanning based on visual identification of the damaged area. The system processor can have access to a stored database of information relating to all specific parts available for the vehicle relating to the parts of the vehicle and that are attached to or in the vicinity of the desired area for repair. A list of all parts and their descriptions that are associated with the desired isolated damaged area on the imaged vehicle can populate from the database and be displayed to the user on the graphical user interface. The user can then choose specific parts from the parts list and create a parts order that can be extracted from the processing system and shared with a desired party for parts ordering.

In conjunction with the parts ordering mechanism of the system, other aspects of completing an estimate can be executed. Many parts that need to be replaced will have a monetary value of work or labor for the time it takes to complete the replacement of that particular part. The said system can attach the monetary value of work or labor to each part chosen to be replaced such as hrs to remove and replace the part. Likewise, many parts need to be prepared for paint or sealing when replaced. The said system can also calculate the monetary value of work or labor done for paint and paint preparation or application of sealants, lubricants, or adhesives, also referred to as refinish times. Other damage not related to the structural damage of the vehicle can be assessed such as but not limited to exterior dents and deviations that would need a monetary value for repair, or times for realigning or repairing any components that may need intervention from a $3^{rd}$ party for repair that have a monetary value associated to them. The system can also use an algorithm associated with exterior deviations such as dents and scratches where if an exterior deviation is scanned and assessed, and can automatically calculate a repair price and time to repair the exterior deviation. The quantified repair times of exterior deviations can be calculated by assessing the depth and size of the deviations as quantified by point cloud deviations collected by the 3D scanner as well as the locations of the deviation. The location of the deviation is important because the time and difficulty of the repair can be greatly affected if the deviation is on a defined body line of the vehicle, the edge of a panel, or any location that makes the damage harder to access. A repair estimate which includes body damage can take the location of the body damage into account and adjust the labor time required accordingly.

Generated point cloud data directly using 3D scanning is advantageous when comparing a damaged vehicle to a vehicle standard because of the accuracy and speed that the gathered point cloud data can portray. Unlike photogrammetry, which uses a plurality of photographs taken from various angles of an object and mosaics the photographs in order to calculate the object's dimensions and generate a 3D model using triangulation, 3D scanning using one or more laser or structured light measures exact distances from the sensor to the object being scanned. By using 3D laser scanning in the present application and creating a point cloud where each point in the cloud is an accurate measure of the point's location in space compared to the laser scanner, an accurate 3D image or shape representation can be generated of the damaged vehicle. In addition, structured light scanning can generate an accurate point cloud by projecting a structured light pattern onto an object and imaging the modified light pattern by at least one camera to capture the ways in which the object deforms the structured light pattern, which can produce an accurate point cloud.

Point cloud measurements of the damaged vehicle are advantageous because of the accuracy of the 3D data that is collected. A point cloud that has been gathered from a 3D laser scanner, for example, can have an accuracy of between about 50-500 microns, with lower end accuracy achievable on available laser scanners. This accuracy is important when comparing a damaged vehicle to an OEM standard because the OEM standard has specific allowable tolerances for damaged parts that are required to be replaced, or in some circumstances, when the parts is below a tolerance, repaired. Photogrammetry methods have been used to compare damaged vehicles such as in the case of body or panel damage based on multiple photographs of a vehicle that are meshed together to form a shape of the vehicle, however the conversion of photographic data into 3D data such as into a mesh file or CAD file format necessarily requires averaging and extrapolation of collected data, which reduces the accuracy of the resulting 3D image representation. Additionally, photogrammetry methods which require multiple images of the same location on an object to obtain sufficient surface resolution can be difficult to execute and extremely time consuming and data intensive to compile and process. Photogrammetry methods are also only accurate if an adequate number of pictures are taken and at specific angles, which can be hard to determine outside of a lab setting and are often miscalculated by the user. Any miscalculation will cause the meshed image to show less accuracy and adequate results for comparing specific damage, in particular structural damage, cannot be attained to a suitable accuracy. In contrast, a 3D scanner can capture a single file for comparison rather than the 20-200 needed for photogrammetry which, in the best circumstance, requires a camera to be specifically calibrated for specific settings such as, but not limited to, background reflectance noise and illumination variance. The 3D image from a laser scanner or structured light scanner also produces a substantially unprocessed and near exact representation of vehicle measurement.

A point cloud comparison works by matching gathered points of data that are in 3D space and correlated in an x,y,z reference field to a like scanned point cloud file or other data file of and OEM vehicle. Preferably, the OEM file is also a point cloud file, which can also be generated from another type of CAD file or 3D file representation. In this case, since one of the point cloud files being compared is the OEM point cloud, most points between the point clouds will be matched. Unmatched points will indicate a location of deviation in the damaged vehicle. All points that do not match or cannot be associated with like points from the OEM file can be classified as outlier points and deemed to be damaged points. Like points of the image data files are gathered, and the collected point cloud data is matched and compared to the point cloud data or CAD file or 3D file representation of the OEM vehicle by matching all points withing each data file that are similar and can be matched to each other. To compare point clouds or data files an algorithm is applied to match and overlay the point cloud 3D files using a matching algorithms. Two non-limiting examples of useful algorithms that can be used to compare point cloud files include use the Nearest Neighbor (NN) and Nearest Neighbor Distance Ratio (NNDR). Deviating points, or points on the damaged vehicle that deviate from the OEM standard, can be shown in a different color than the undamaged and matched points on a graphical user interface, and can be portrayed as a specific color for a specific measured difference. For example a heatmap can be used to show differences of outlier points within the point cloud that are predetermined by the system as a unit of measurement.

In a specific example, suppose there is a key point p from the damaged vehicle point cloud waiting for matching to a key point in the target OEM vehicle point cloud for comparison. p1, p2, and p3 are detected as the most three similar key points through comparing their similarity of descriptors, and they are sorted according to the degree of similarity. The NN algorithm directly regards the most similar points p1 and p as a corresponding point pair. For solving the effects from wrong corresponding key point pairs, an Iterative Closest Point algorithm (ICP) can be used as a fine calibration after poor surface matching results in the registration. The ICP algorithm requires the entire point cloud to participate in the iteration to maximize the pairing of similar points within the point cloud.

The present system and method can be used for assessing vehicle damage and also for providing a repair protocol for repairing the vehicle. A three dimensional image is captured of a damaged vehicle and compared to a vehicle standard of the same type. An overlay of the damaged vehicle and the vehicle standard is graphically displayed and location of damage on the damaged vehicle are identified to assist a technician with vehicle repair. Tool anchoring locations and jig anchoring locations can also be shown on the graphical display as part of the protocol to repair the vehicle.

FIG. 1 is an example system for capturing 3D scan data and transferring the data to a processor. Assessing damage to a vehicle is done by scanning the vehicle with a three dimensional (3D) scanner 10, such as an optical scanner collected using one or more laser scanner or Light Detection and Ranging (LiDAR) scanner, or structured light 3D scanner, to generate a damaged vehicle point cloud image of part of all of the damaged vehicle and comparing the first point cloud image with a 3D image of the same vehicle type. The 3D scanner 10 is connected to the processing system 12 which is configured to process the 3D point cloud of a damaged vehicle 14 and process a point cloud cluster of like shapes of the point cloud of the damaged vehicle 14 and its components in accordance to the described embodiments. The point cloud of the damaged vehicle 14 includes one or more damaged area 16a, 16b that is a result from a collision. The 3D scanner 10 may also implement various methods in addition to laser or structured light scanning for gathering data including, but not limited to, white light, audio or infrared technology.

In its typical operation the 3D scanner 10 can gather information relating to the damaged vehicle by generating a replica point cloud cluster that is accurate to greater than, for example, 0.2-2 mm and represent the precise shapes of the damaged vehicle in a point cloud of the damaged vehicle 14 on an x,y,z scale in three dimensions as a point cloud. The point cloud information is then transmitted to the processing system 12 to be stored and analyzed. The user can then use processing system 12 to access an OEM database to search for like vehicle baseline image files of the same make, model and year to use to compare the newly gathered point cloud data of the damaged vehicle to an image of the OEM standard vehicle. The processing system 12 can then overlay the point cloud data file of the 3D scanned damaged vehicle and the baseline image file of the same vehicle by recognizing areas of the point cloud data that represent like points, geographical edge profile, curvature and texture clusters of the two files. Areas of differentiating point cloud data can then be displayed on a graphical user interface as different colors as an image overlay and can be determined to be a damaged area 16. The processing system 12 can display this information on a graphical user interface and also create a series of reports based on the user preferences.

In some embodiments the 3D scanner 10 may be used to scan certain areas of the vehicle. For example, if the damage to the vehicle is isolated to the front or rear of the vehicle, the user may choose to scan only those areas. Damage to the damaged vehicle is represented by calculating the differences of points within two files, and preferably two point cloud files, with the damaged vehicle point cloud file as collected by the 3D scanner and a second OEM baseline 3D file, and ascertaining points within the scanned point cloud of the damaged vehicle 14 that are beyond a predetermined threshold of difference by recognising the points of the point cloud cluster overlay that are outliers to the matched points within the point cloud overlay. The predetermined threshold can be, for example, less than 10 mm, less than 5 mm, or preferably 2 mm or less in deviation from the vehicle standard based on the point cloud overlay and quantitative change in x,y,z location. Comparison of the point cloud image of the damaged vehicle with the archived 3D image of the vehicle OEM standard in the vehicle database provides an indication of the extent of the damage. Further, analysis of the point cloud can provide an indication of the required alignment, an estimate, and a repair protocol to a technician for repairing the damage.

The 3D scanner 10 and associated image processing system 12 are used to collect an image of the damaged vehicle. Various 3D scanners can be used, including but not limited to LASER triangulation 3D scanners, structured light 3D scanners, contact-based 3D scanners, LASER pulse-based 3D scanners, time-of-flight 3D laser scanner, and other laser-based 3D scanners. In the present system one or more 3D scanners can be used of one or more different types in addition to the laser scanner to collect the desired point cloud image. The collected image can then be cleaned by the processing system 12 to remove any unwanted artifacts, such as, for example background, superficial aberrations, and specular reflections. The processing system 12 then compares the received point cloud image of the damaged vehicle 14 with the corresponding reference image of the OEM vehicle from the database, and can compare the two files along one or more of several attributes, e.g., point deviation, triangular plane deviation, edge distribution, texture, and shape. Using a variety of computer vision techniques, the processing system 12 can recognize where and how the received images depart from the reference images by comparing the point clouds, and identifies the corresponding part(s) and/or regions on the damaged vehicle that are damaged. Corresponding areas of the damaged vehicle are then matched in the software to the OEM standard and presented as an overlay of images that will show few or no differences in areas that are not damaged. The image overlay is created by the image processing system by matching an array of points of the damaged vehicle 3D dataset using image processing to the vehicle standard 3D model dataset and optionally using machine learning technologies.

The point cloud image of the damaged vehicle may be stored in a memory operatively connected to, either wired or wirelessly, or in communication with the 3D scanner 10 and processing system 12. The memory is preferably in communication with the one or more processors or image processing systems, which can be local or in a connected cloud-based system, to compare the point cloud of the damaged vehicle. The image processing system, which also be local or cloud-based, can isolate segments from the point cloud of the damaged vehicle that are misaligned compared to the vehicle standard, represented by model point cloud for a vehicle of the same type which is stored in the vehicle database. This model point cloud or other 3D file provides a standard for the plurality of points, also referred to herein as reference loci, in the standard OEM vehicle. The same points on each vehicle can be selected on each image, referred to herein as reference loci, that can then be processed and compared by the image processing system to ascertain the angles of deviation as well as a measurement of difference that can be represented in any unit of measurement. Multiple points can be chosen by the user or automatically based on greatest deviation for processing of angle and unit deviations and represented as data set comprising the x,y,z coordinates of the points in the point cloud.

The one or more processors can then process the image by, in one embodiment, by comparing the 3D OEM model to the point cloud of the damaged vehicle 14 by identifying one or more reference locus in the 3D model, determining the relative coordinate position of the reference loci in the point cloud, identifying the same reference locus in the damaged vehicle, and determining the difference between the coordinates of the reference loci in the model 3D dataset to the coordinates of the reference locus in the point cloud of the damaged vehicle 14. The difference in position between the two coordinates provides the distance and angle of deviation of the reference locus in the damaged vehicle. Repeating this process for various locations in the damaged vehicle where there is aberration of the point cloud compared to the vehicle standard, indicating a site of damage, can provide an indication of the degree and extent of damage and misalignment. Based on the comparison of multiple reference loci of the model point cloud to the damaged vehicle point cloud, a set of loci with deviating coordinate point compared to the vehicle standard can forming a point cluster associated with a site of damage. The display or graphical user interface can then receive the data from the image processing system to generate a display providing information the vehicle overlay identifying the areas and extent of damage and/or misalignment to the vehicle, as shown in FIG. 1. The display, preferably presented in a graphical user interface, can also be configured such that the user can choose to toggle each digital image on and off. The hashed areas of the image shown represent the differences between the two images that have already been overlaid. The hashed area in the figure represents the area of the vehicle that has sustained damage, or damaged area 16a, 16b, and it is clear from the overlaid image of the OEM vehicle where the misalignment is. Data can further be exported as an image file in a different file type, such as, for example, a mesh file, computer-aided design (CAD) file, STL file, PDF file, STEP file, or other filetype.

Damaged areas can be shown as differences in colour, shading, outline, or any other display method that makes clear which is the image of the OEM standard and which is the damaged vehicle. The display can provide a flat 2D vehicle map, however preferably the position of the vehicle image can be adjusted in the display to provide different views of the damaged vehicle compared to the vehicle standard. In another embodiment, the display can be a 3D display or holographic display with opportunity to adjust the viewing angle so the technician can get a full image of the vehicle damage. The user can also have the capabilities to toggle each image on and off by pressing a virtual button on the image processing system. Without being bound by theory, it has been found that providing technicians with 2D and 3D visualization of the damage enables the user to understand the repair and can improve repair quality and reduce repair time.

The 3D image from a damaged vehicle scan compared to a digital vehicle composite image for a vehicle of the same type (make/model/year/features) generates directional, angular and distance comparative points between the two files based on the same set measurement points on each digital composite file. Based on the calculated angular and directional deviations, the system will suggest optimal points for anchoring and fastening tooling for reorientation. The suggested reorientation angles, distance and direction can also be given to the user for reorientation based on the damaged calculated by the system.

The imaging system can use one or more of various scanning technologies to collect a 3D dataset of the damaged vehicle. In another embodiment, time-of-flight 3D laser scanning technology employs an active scanner that uses laser light to probe the subject and a time-of-flight laser range finder. The laser range finder finds the distance of a surface by timing the round-trip time of a pulse of light. In another embodiment, triangulation based 3D laser scanning can be used which employs active scanners that use laser light to probe the environment. With respect to time-of-flight 3D laser scanners, the triangulation laser shines a laser on the subject and exploits a camera to look for the location of the laser dot. In another embodiment, structured-light 3D scanning can be used to project a pattern of light on the subject and look at the deformation of the pattern on the subject. The structured light pattern is projected onto the subject using either an LCD projector or other stable light source, and a camera, offset slightly from the pattern projector, looks at and records the shape of the pattern and calculates the distance of every point in the field of view. In another embodiment, modulated light 3D scanning shines a continually changing light at the subject. Usually the light source simply cycles its amplitude in a sinusoidal pattern. A camera detects the reflected light and the amount the pattern is shifted by determines the distance the light travelled. Modulated light also allows the scanner to ignore light from sources other than a laser, so there is no interference. In another embodiment, the imaging system can also use stereo photogrammetry to augment the 3D scanning, which is based on a block of overlapped images used for object reconstruction using 2D images.

To general a repair protocol based on the compared point cloud data, the image data sets can then be analysed to provide the user with the optimal point to anchor tooling for repair and for anchoring the tool. The user is given calculated data based on the original calculations that states the angle distance and direction the user must use the tooling to repair the vehicle. After the repair protocol has been completed a post adjustment 3D scan of the vehicle can also be used to gauge the success of the adjustment and indicate if further adjustment is required, following the same procedure. Once there are no significant alignment differences the repair is considered completed.

Figure 2:
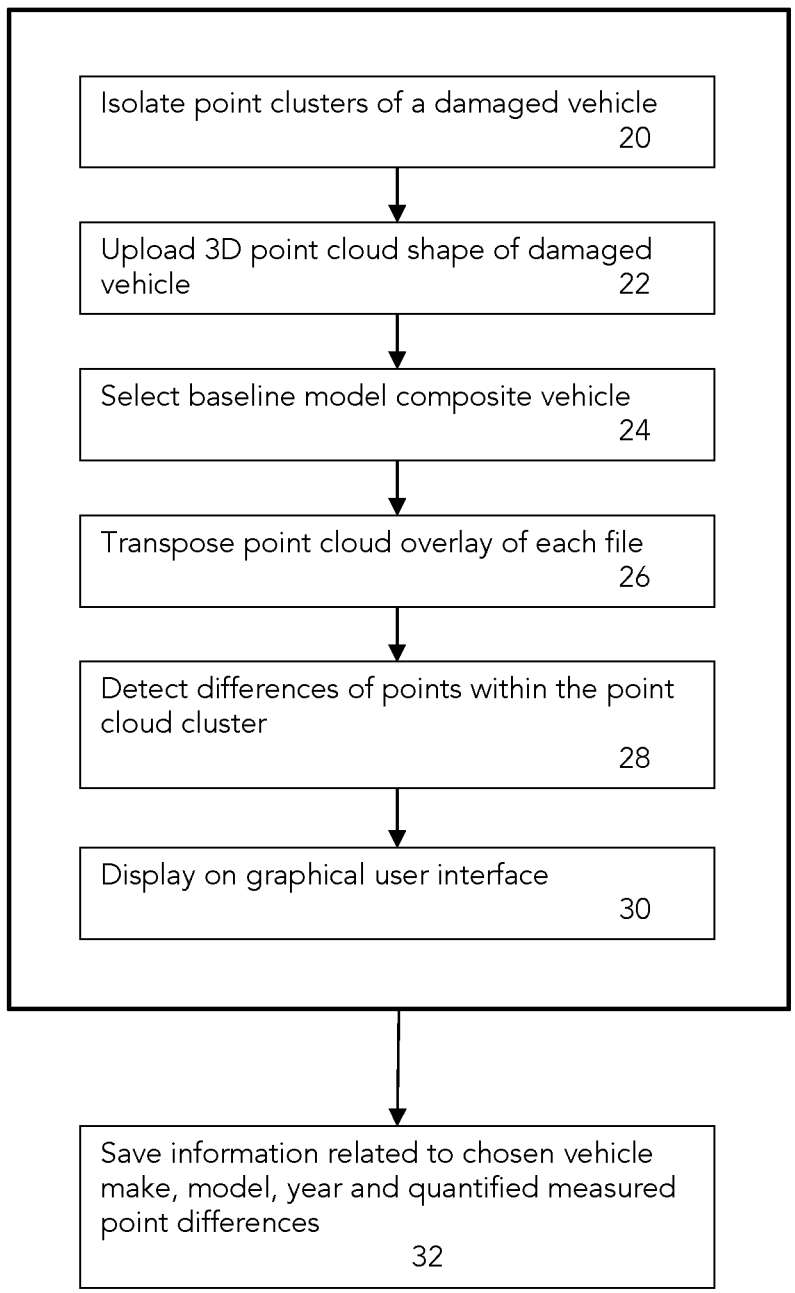
FIG. 2 is block diagram representing steps of gathering and isolating point cloud data for a damaged vehicle.

FIG. 2 is block diagram representing steps of gathering and isolating point cloud data for a damaged vehicle in a computer processing system that can operate the vehicle damage assessment method in accordance to the described embodiments. The computer processing system may take form of a typical or specialty computing system. For example, the computer processor may be, but is not limited to, a personal computer, laptop, or tablet. Furthermore, the computer processor may be local or part of a distributed computing system that is connected and communicates with a master server, such as on a cloud or network. In operation the processing system receives isolated point cloud clusters 20 from the 3D scanner and uploads the 3D point cloud shape to its processing system 22. Optionally the processing system may receive data from an outside source such as, but not limited to, a USB storage device or from an outside source file that may be downloaded via the internet or cloud network through, for example, a secure portal. The received point cloud data can then be stored on the processing system or alternatively be accessible to the processing system for image processing. Upon uploading the point cloud shape of the damaged vehicle 22 the processing system will save the uploaded data to its memory or to the memory of an accessible and connected processing system. The user can then activate an executable computer program to begin the operation of accessing information related to the damaged vehicle point cloud shape. The user will select the baseline model composite vehicle 24 file from an archive of stored files on the computer processor, or alternatively the processing system can compare the isolated point cloud of the damaged vehicle to vehicle standards in an OEM vehicle database and match it to a point cloud of a known OEM standard in the OEM vehicle database. Upon execution of the executable computer program the user can transpose a point cloud overlay of each point cluster of the damaged vehicle and OEM vehicle 26. The computer processor will then compare the files and detect differences of points within the one or more point cloud clusters 28. In one embodiment this can be done using a convoluted neural network by ascertaining points within the scanned point cloud shape of the damaged vehicle that are beyond a determined threshold of difference to the baseline model composite file.

Estimating damage to the vehicle can also include identifying and isolating clusters of point cloud data from the damaged vehicle point cloud shapes that differentiate beyond a predetermined scope of measurement from the baseline model point cloud file and after the aligning of the shapes based on like geographical edge profile, curvature and smoothness. Upon completion of the point cloud shape overlay by the computer processor the user may manually generate reports by executing various commands in the processing system and displaying the results on a graphical user interface 30. Finally, the processing system preferably saves all information related to the chosen vehicle make, model, year and quantified measured point differences 32 to a computer storage system of volatile (RAM) or non-volatile (e.g. USB drive) or cloud based server. This saved data can be used by the processing system in the future to correlate like angular and measured damage to a like vehicle year, make and model in other damaged vehicles in order to machine learn similarities of parts data, estimates created, repairs required, and cost of work completed, to new vehicle scans at other locations of repair facilities in order to faster order parts and pre-form estimates. This saved correlated data can be useful to streamline future damage assessments and is preferably saved on a master server or network-accessible database for access at various user sites.

Figure 3:
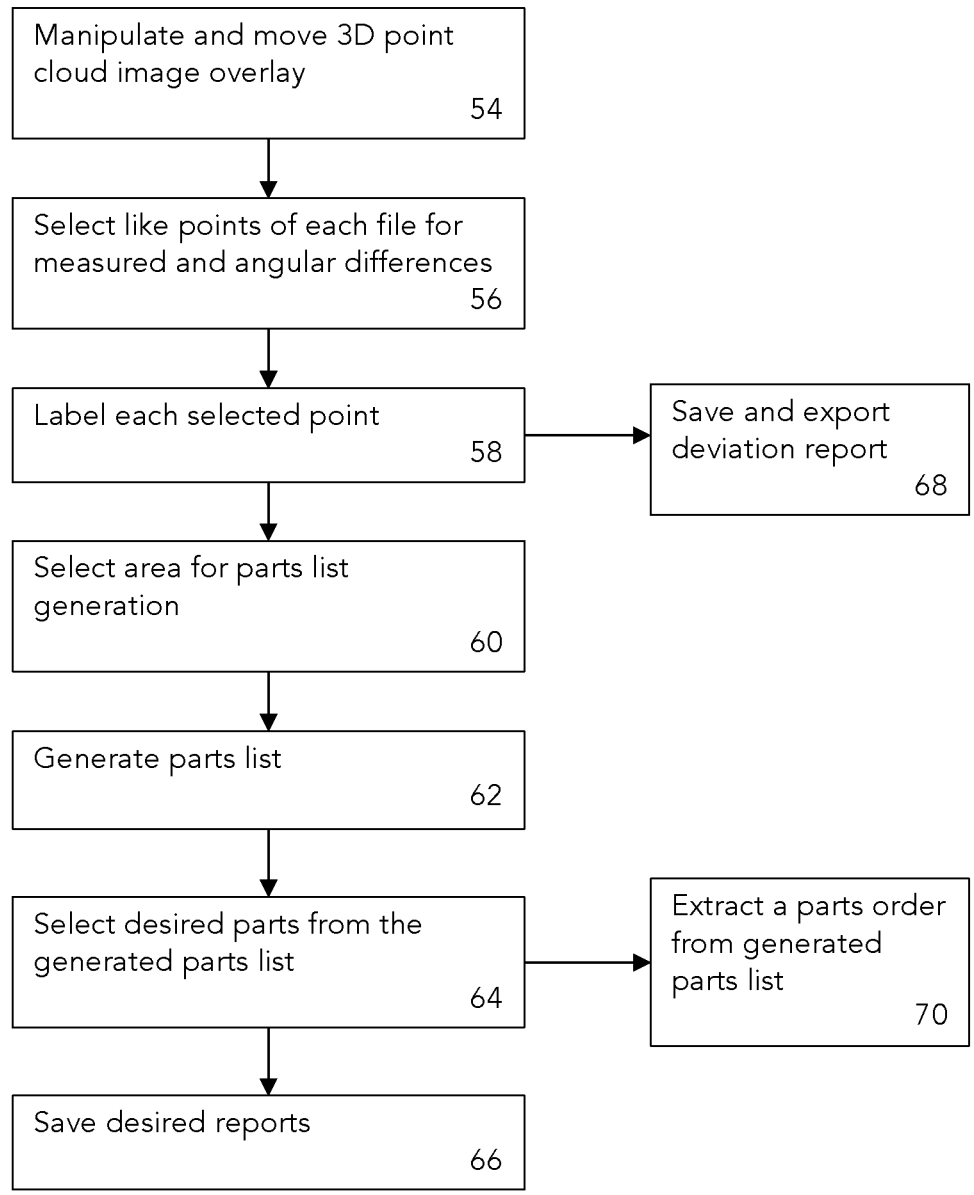
FIG. 3 is a block diagram representing steps of point cloud image overlay and comparison within the executable processor program.

FIG. 3 is a block diagram representing steps of a point cloud image overlay method within an executable processor program. The embodiment shown provides an example of the user's ability and options to manipulate the executable computer program to generate reports and extract information from the chosen point cloud file overlay that represents the damage to the vehicle. This is an example of a vehicle with no previous data stored within the master server or database and therefore the steps to gathering data do not involve gathering data from the server that may relate to a previous repair. Once a 3D scan of the vehicle is complete, the user is able to manipulate and move the 3D point cloud shape overlay 54 in order to see all areas that were scanned by the 3D scanner and recorded point cloud file overlay. This can be done in a graphical user interface by manipulating the shapes in a 360 degree view in any direction. The user can also zoom in and out of the point cloud file overlay to see the damage point cluster in greater detail. The computer processing system automatically overlays the 3D point cloud of the damaged vehicle onto the point cloud image of an OEM standard vehicle. The user can then be enabled to select like points of each file for measured and angular differences 56. These points can be selected on the undamaged area of the point cloud file overlay and then labeled 58 with a desired identification. The user can then select points of the same area of the area damage point cluster. Upon selecting a point from each the undamaged vehicle baseline composite file and the damaged vehicle cloud cluster shape, the computer processor will calculate the difference of the points on an x,y,z scale within the point cloud cluster overlay to represent a quantified angular and measured difference between the two points. In another embodiment, the selection of one point on one of the point clouds can initiate a matching algorithm in the processing system to extract the nearest or closest point on the other point cloud image. The collected data can then be stored to the processing system and exported 68 for reporting purposes.

In addition to gathering data sets of angular and measured differences the user can select an area for a parts list generation 60 by, for example, by highlighting or selecting an area of the point cloud overlay on the graphical user interface. The processor can then populate or generate a list of parts 62 that are directly related to the selected area and are integral to that area of the damaged vehicle that was assessed by 3D imaging. The user can then select desired parts from the generated parts list 64 and extract a parts order from the desired list 70 comprising the selected desired parts. The desired reports can then be saved 66 on the processing system, server, or connected memory, preferably alongside the 3D scanning data of the damaged vehicle to match the vehicle damage with the parts selected for later use in generating estimates of other damaged vehicles with similar damage patterns. Additional detail can be saved regarding the chosen vehicle make, model, year and quantified angular and measured differences between the point cloud images of the damaged and OEM vehicle. All of the data gathered on the processor by the executable program user including the deviation report and parts lists can be stored within a server for recollection of the computer learning system. The computer learning system can also attach the extracted data to the particular year, make and model and its correlated angular and measured differences for later recall for processing future damaged vehicles.

Figure 4:
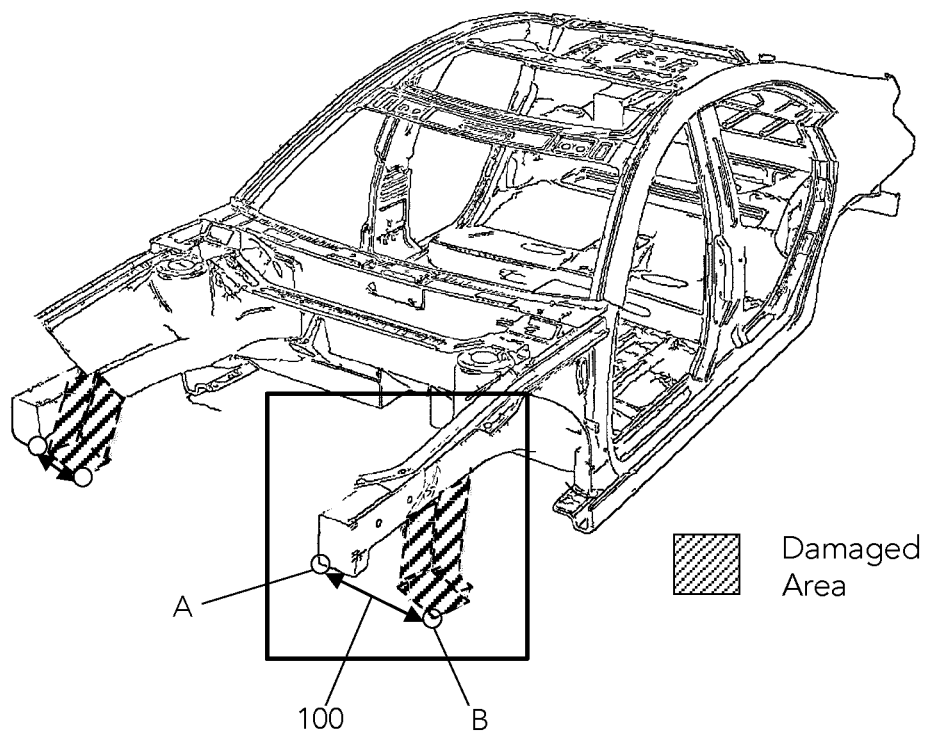
FIG. 4 is an example of a point cloud file overlay of an undamaged and damaged vehicle with selected points of measurement.

FIG. 4 is an example of a point cloud file overlay of an undamaged and damaged vehicle showing a baseline point cloud model of an undamaged vehicle with selected points of measurement. The image shows a damaged vehicle overlaid with an image of the vehicle standard showing the location of structural damage. The point cloud overlay is created by aligning the scanned geometric point cloud data shape of the damaged vehicle onto the baseline point cloud file of an undamaged vehicle. The processing system will locate like points within the two point clouds of each shape and aligns them based on like geometric edge patterns, smoothness and curvature. Outlier points can be represented as a different color from the baseline point cloud image and can be assumed to be the damaged area of the vehicle. This point cloud overlay can then be stored onto the processing system and shown on a digital display or graphical user interface. The represented point cloud overlay is interactive to the user, allowing them to perform certain functions such as, but not limited to, manipulating the shapes in 360 degrees and zooming in and out. Additionally, the user can place points A, B for reference measurement differences onto the point cloud overlay and the damaged point cloud cluster of outlier points. Quantified measured differences can be displayed by selecting like points A, B that represent the same specific area of the vehicle and damaged area to display a numerical value of measurement of deviation 100 that may represent, but is not limited to, angular differences and measured differences of value that represent the point cloud cluster of damage. This represented damage will display a numerical value correlating to the differences of point cloud points from the undamaged vehicle point cloud shape to the scanned point cloud cluster of the damaged vehicle on an (x, y, z) Cartesian scale of reference. Additionally, the user can allocate a label for each point of differentiating reference measurements that can then be displayed on a table or graphical display that can be printed or sent as a transferable computer file. The graphical user interface is used for displaying points on the point cloud cluster that represent a damaged area of a vehicle, and the user can be enabled to select a point cloud composite of a desired vehicle to compare to the scanned vehicle point cloud shape scanned by the 3D scanner. The image processing system compares points from each point cloud file and can determine a point location in Cartesian space, geometrical edge pattern, smoothness and curvature at the location on the vehicle. An image overlay of the two files is generated by the processing system to align like points of the two files based on point location, geometrical edge pattern, curvature and smoothness of each point cloud file. The differentiating points on the point cloud cluster of each the two files can be represented by the processing system, for example as a different color to the points on the point cloud that match in location deviation from standard, geometrical edge pattern, curvature and smoothness, and can be shown in a different color on a graphical user interface display at the area on the damaged vehicle that has been found by the processor to be damaged.

Figure 5A:
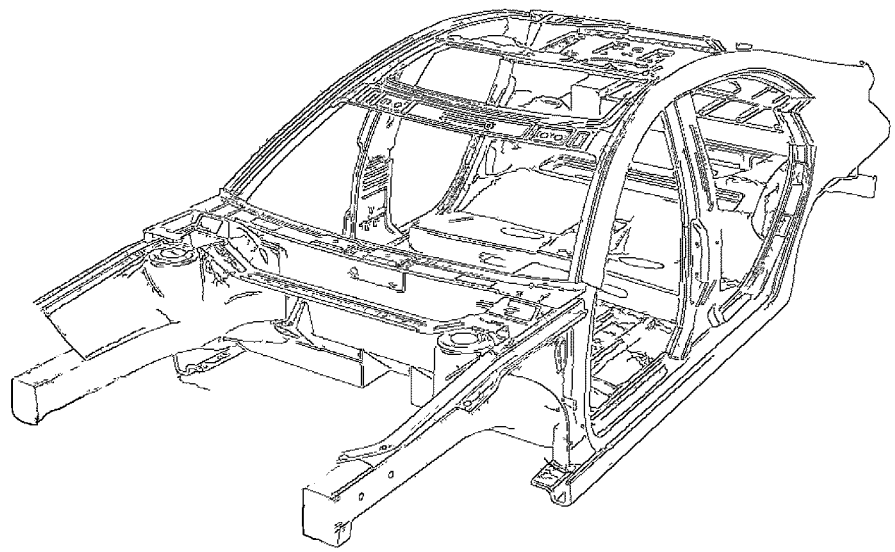
FIG. 5A is an example of a baseline point cloud file of an undamaged vehicle.
Figure 5B:
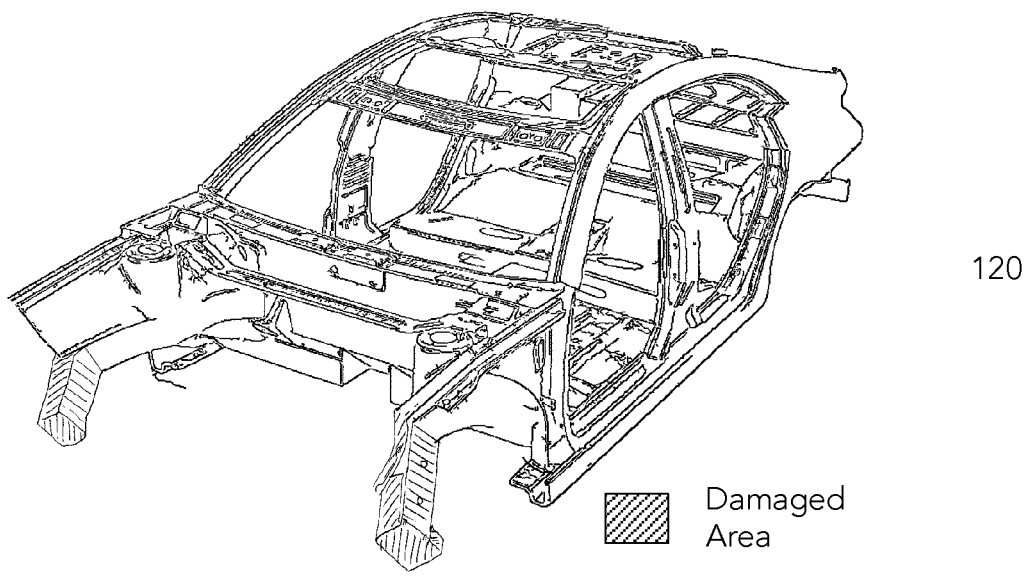
FIG. 5B is an example of a point cloud shape of a damage vehicle.

FIG. 5A is an example image of a baseline point cloud file of an undamaged vehicle and FIG. 5B is an example of a point cloud shape of a damage vehicle. The image dataset of the baseline point cloud file is used when comparing the damaged vehicle to determine the extent and location of damage. An isolated file of each the scanned damaged vehicle point cloud cluster shape file 120 and the baseline undamaged vehicle point cloud file 122 is obtained. The 3D image data of the damaged vehicle is obtained from the 3D imaging system and stored on a computer or processor for processing. The system can then compare the digital scan file to a source file of the same vehicle/make/model to and represent the data as an image overlay, optionally with a shaded or colored heat map to indicate the locations of most and least deviation from the vehicle standard. Alternatively, each of the vehicle standard image and the damaged vehicle image can be represented by a different color. In one display representation only the damaged areas will be of a different color and the undamaged areas will be the same color as the vehicle standard. Measurement of deviation can be done automatically or by a user. In one embodiment the user can select a point on the image of the damaged vehicle and the system can locate the corresponding point on the undamaged vehicle image, or vice versa. The system can then measure the differences of angle, distance, and direction to the same reference points. A manual option can also be provided to enable the user to compare two coordinates and provide the angle and distance data between the cartesian coordinates.

The scanned damaged vehicle shape file 120 is a geometric point cloud shape that represents the real-world damaged vehicle and its components and reflects the exact shape of the real world vehicle with measurements greater than 2 mm. The collected points within the file are gathered by a 3D scanner and stored on the processing system. The damaged vehicle point cloud file can also be uploaded by an external source and stored on the processing system as described previously. The user can scan the same damaged vehicle multiple times to compare against this image dataset which is part of an archive of undamaged vehicle image datasets in a vehicle database. The baseline undamaged vehicle point cloud file 122 can be part of an archive of vehicle baseline files that can be stored on a processing system or downloaded or accessible from an external source such as a networked processor or cloud storage location. This file can be, but is not limited to, a point cloud shape file or a processed computer aided design (CAD) file. The CAD file, or other compatible vehicle shape files, can be uploaded to the archive or database of undamaged vehicle file shapes and sourced from engineering or quality control files from the manufacturer of the vehicle. Likewise, the file can be captured from an undamaged vehicle of like make and model. The image in FIG. 5B can also be overlaid with the image file 5A to indicate the location of damage compared to the vehicle standard shown in 5A. This image dataset is processed by the image processing system and can be compared and overlaid automatically with the vehicle standard as shown in FIG. 5A. The image processing system can represent the damage as a specific color based on predetermined data within the image processing system. The angles and measurements of deviation, and angles and measurements for repair can also be calculated by the image processing system and sent to a display device for display. The image processing system can also suggest one or more tooling anchoring points as well as one or more jig anchoring points for repair. The user can perform work on the vehicle and then rescan the vehicle to further compare the progress of repair buy clicking on locations on the image to show the measured deviation during the course of the repair.

Figure 6:
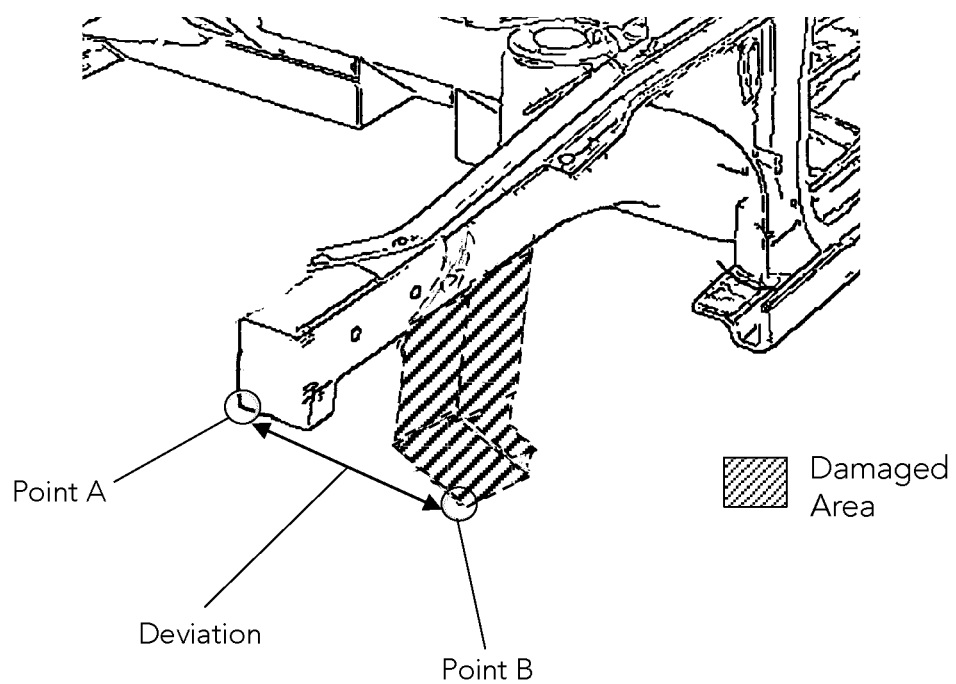
FIG. 6 is a close-up image of a damaged area of the point cloud overlay with numerical values of points of differences with assigned labels.

FIG. 6 is a close-up image of a damaged area of the point cloud overlay with numerical values of points of differences with assigned labels. Shown is a point cloud cluster overlay of an undamaged baseline vehicle point cloud file shape and a scanned damaged vehicle point cloud shape with label points A, B for quantified comparisons of points of deviation. The user can choose like points A, B from the point cloud overlay and the outlier points within the point cloud cluster that represent damage, and the processing system will compare the differences of exact points within the point cluster to ascertain angular and measured data sets to be represented on the display or graphical user interface of the processing system. Each pair of points A, B can be represented in a graphic or table on the graphical user interface screen of the processing system. It is noted that the selection of one point can automatically trigger the processing system to select a corresponding point on the other point cloud file or location on the vehicle standard image file. As the user chooses more pairs of points to compare, the comparison can be represented on a table for reference, showing the location of the compared points Point A ($x_A$, $y_A$, $z_A$), Point B ($x_B$, $y_B$, $z_B$), and the coordinate vectors and angle of deviation. Likewise, each pair of points A, B can be labeled by the user as desired. This table of data can be shown as a scroll over table visible upon cursor interaction, or in a permanent location on the graphical user interface. Any number of compared points can be selected, and each time one point is chosen by the user, the corresponding point can provide an anchor point on the other point cloud image to the previous point and used for comparison by the processing system. The outlier points cluster of the such as that representing the damaged vehicle can be represented as a different color than the point cloud data file of the baseline vehicle, and the two cloud clusters can be matched up with edge geometry, smoothness and pattern, showing a third colour where the two images are substantially overlaid without significant deviation. The deviation between the outlier points in the point cloud file for the damaged vehicle are measured against the points of differentiation of the baseline vehicle point cloud shape by the processing system to calculate the angular and measured differences, and can also be displayed as a colored or shaded heatmap to show point deviation from the standard.

Figure 7:
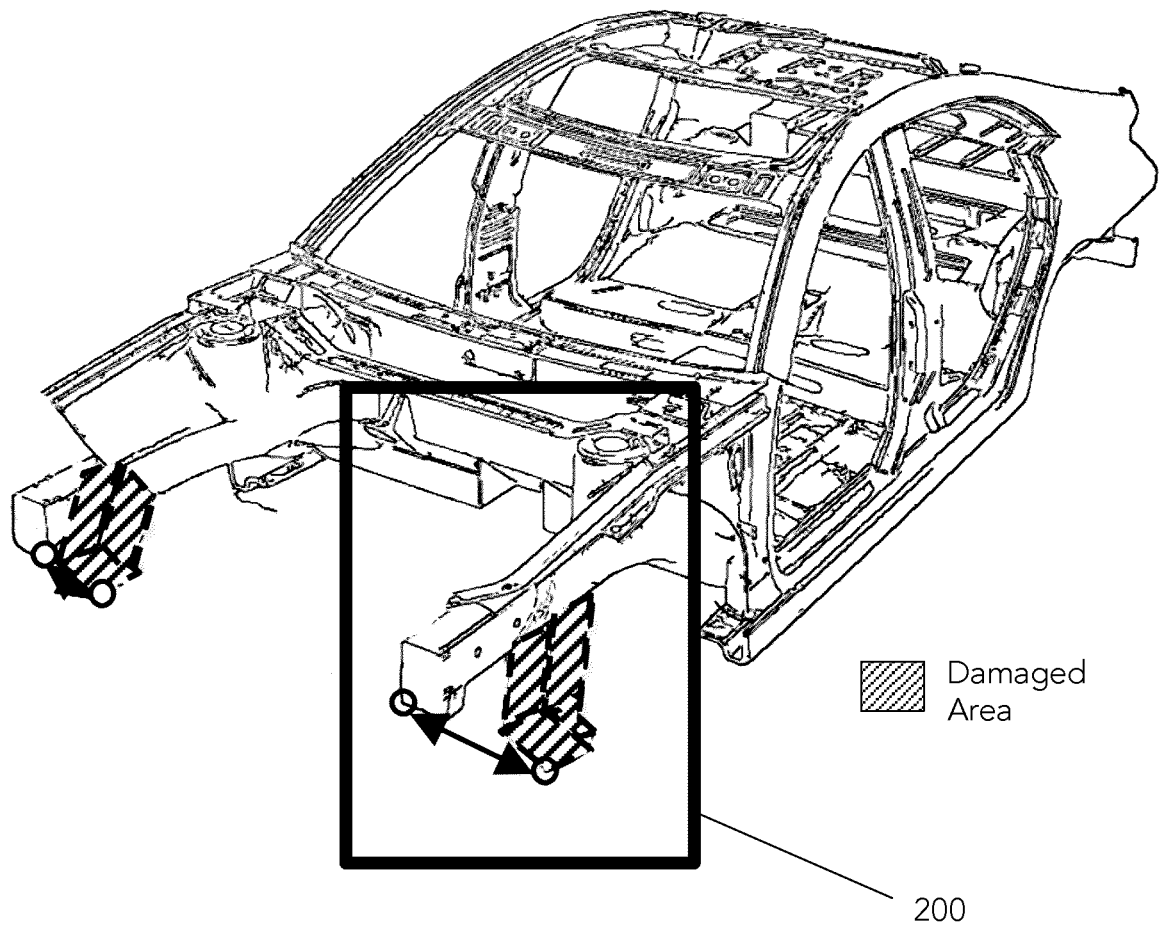
FIG. 7 is an example of a point cloud file overlay with the desired area for parts ordering selected.

FIG. 7 is an example of a point cloud file overlay with the desired area for parts ordering selected. A point cloud overlay of the damaged vehicle point cloud shape and the undamaged baseline vehicle point cloud shape with a parts selection area 200 that has been selected by the user. The parts selection area 200 selected by the user is the desired area of the point cloud cluster overlay of the two files that user would like to establish a parts list. Each component that is associated with the chosen parts selection area 200 can be established by a database or archive of components that is stored on a processing system or connected processing system or network and that is associated with the parts selection area 200 that has been chosen for the specific model of vehicle that is being compared. A complete parts list can populate in a separate window, tab, or location in the graphical user interface. The user can then select which parts or components are needed for the repair of that vehicle and export and save that list for parts ordering and estimate purposes, and the system can also automatically suggest parts or prioritize parts based on overlap of the part with the damaged area. The completed parts list that is created by the user and that is associated with the particular vehicle year, make and model is then saved on a server associated with the executable computer program or associated connected processor or memory along with the deviation calculations representing the damage to the damaged vehicle. The saved data of the particular parts list components can then be associated with the particular angular and measured differences of the vehicle point cloud overlay cluster shape and the particular year, make and model of the point cloud cluster overlay shape. This information can also then be associated to a damage assessment of a like vehicle make, year and model that has sustained similar angular and measured differences, providing a trained system that learns from user parts selection which parts are desired for any given damage pattern. The stored data can be accessible to a user of the software that is at any location on any other vehicle. The processing system can also apply machine learning and attach a similar parts list that was created or edited by a user in a repair or estimate to a similar vehicle and similar angular and measured damaged vehicle of the same year make and model and suggest a parts list that reflects the chosen parts list of the previously chosen parts list of the previously assessed vehicle of like year make and model with similar angular and measured damage.

Figure 8:
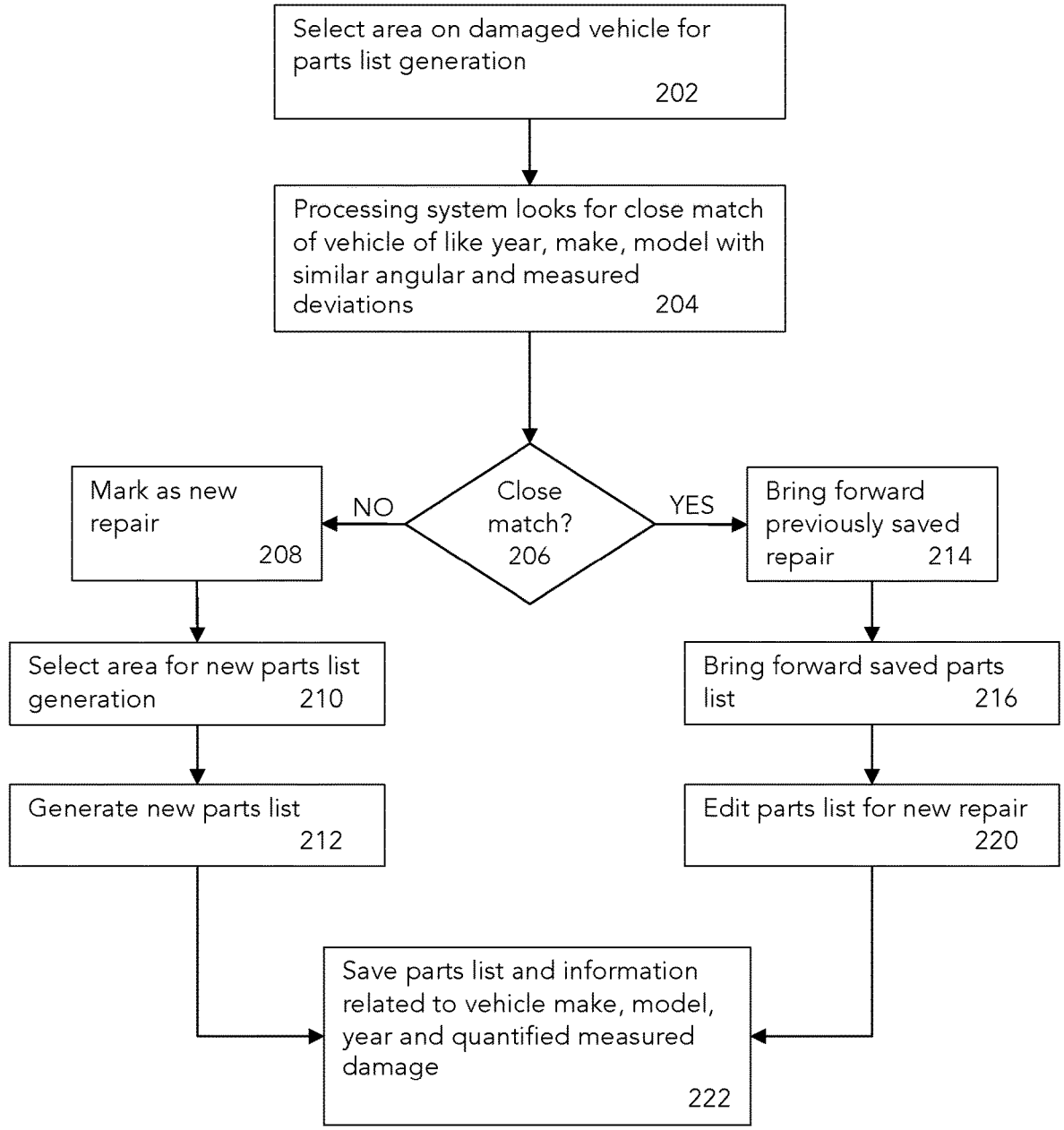
FIG. 8 is an example block diagram that depicts a process of generating a parts list based on the desired chosen area of damage on the vehicle.

FIG. 8 is an example block diagram that depicts a process of generating a parts list that is based on the desired chosen area of damage on the vehicle. The point cloud overlay of the damaged vehicle and baseline vehicle standard can be used to select an area for parts list generation. The internal and executed processes of generating a parts list can also be based on a selected parts selection area at the location of damage on the damaged vehicle. From the point cloud overlay of the damaged vehicle and vehicle standard, a parts selection area on the damaged vehicle can be selected for parts list generation 202. As the user selects the area on the vehicle for generating parts list, or the damaged area is automatically identified or selected based on deviation from standard, the processing system can draw from saved data pertaining to vehicle repairs with similar quantitative damage profiles and recall and select a list of parts associated within the selected area that are integral to the finished product from the manufacturer. The specific components and parts lists of the assessed vehicle relate to the real-world vehicles components and can be stored on a master server or central network location along with a database of vehicle damage and repairs. A parts list can then be generated by isolating the area of the vehicle point cloud shape overlay that represents a specific area of the real-world vehicle. This isolated area will have stored data points stored within the baseline vehicle composite point cloud file that represent and are mapped to physical parts and components that are integral to the standard real-world vehicle and can be called upon as a list that the computer processor will generate based on the specific isolated area.

Once the area is selected on the damaged vehicle, the processing system looks for or searches for close matches for vehicles of like year, make, model with similar angular and measured deviations 204. The processor looks for a close match 206 and the results of the search will either bring forward vehicles that are related with similar damage in a similar area, or result in no match. If the processor matches the selected damaged vehicle with a similar vehicle with similar quantitative damage, it will bring forward a previously saved repair 214 and with it, bring forward a saved parts list 216 and preferably a full estimate including labor and incidental costs, associated with the vehicle with a close match. The processor can thereby categorize the chosen parts list of specific vehicles year make and model and associate the parts list of these vehicles with the specific angular and measured damage of that specific vehicle year, make and model as calculated between the collected point cloud of the damaged vehicle and the vehicle standard data. The processor can match one or more vehicles with close quantitative damage according to the point cloud overlay calculations and provide an isolated parts lists relevant to the repair. The processing system will then recollect the suggested parts list based on the specific year make, model and angular and measured damage and suggest a parts list that can be used where there is data in the system from another user who repaired and created a parts list from a vehicle of same year, make, model and angular and measured damage. Additionally or alternatively, the processor can bring forward a merged parts list, optionally ranked by frequency of use or selection, based on a plurality of related previously saved repairs as relevant to the damaged components of the particular vehicle being repaired, with each parts list associated with the selected area of the real-world vehicle and its components and is generated based on the selected damaged area and parts list from a previously repaired vehicle. Based on the parts list(s) brought forward, the user can edit the current parts list for the new repair 220 of the damaged vehicle. Specific parts from the generated parts list can be selected by the user to create a savable file of specific parts needed for that specific vehicle repair of that specific location. Furthermore, the system can also generate a more specific parts list based on a previously generated and selected parts list from another location that represents a vehicle of like damage and same year, make and model. As a user selects the desired parts for repair from the generated parts list from the desired isolated area, the system will save the parts list and information related to vehicle make, model, year and quantified measured differences 222 and can make it available for other repairs to reference the parts list that the system then specifies as the most optimal for that specific repair based on similar repairs of a vehicle of same year, make, model and angular and measured damage.

When a vehicle is assessed for repair and no close match to another vehicle with a similar quantitative point cloud with similar angular and measured deviations, the repair is marked as a new repair 208. The area on the damaged vehicle is identified and selected for generation of a new parts list 210, and the new parts list will be generated 212 based on the area selected on the damaged vehicle and the known components of the vehicle in that location based on the standard vehicle of like year, make, model which was compared by point cloud overlay. The parts database with parts and components mapped by vehicle area can bring forward the parts in the location of damaged as determined by the point cloud overlay and the processing system can present the generated parts list for the new repair 212 for consideration on parts ordering. The generated parts list from the desired isolated area is then saved together with the parts list and information related to vehicle make, model, year and quantified angular and measured differences and measured damage 222 and can be made it available for other repairs to reference the parts list that the system then specifies as the most optimal for that specific repair based on similar repairs of a vehicle of same year, make, model and angular and measured damage.

Figure 9:
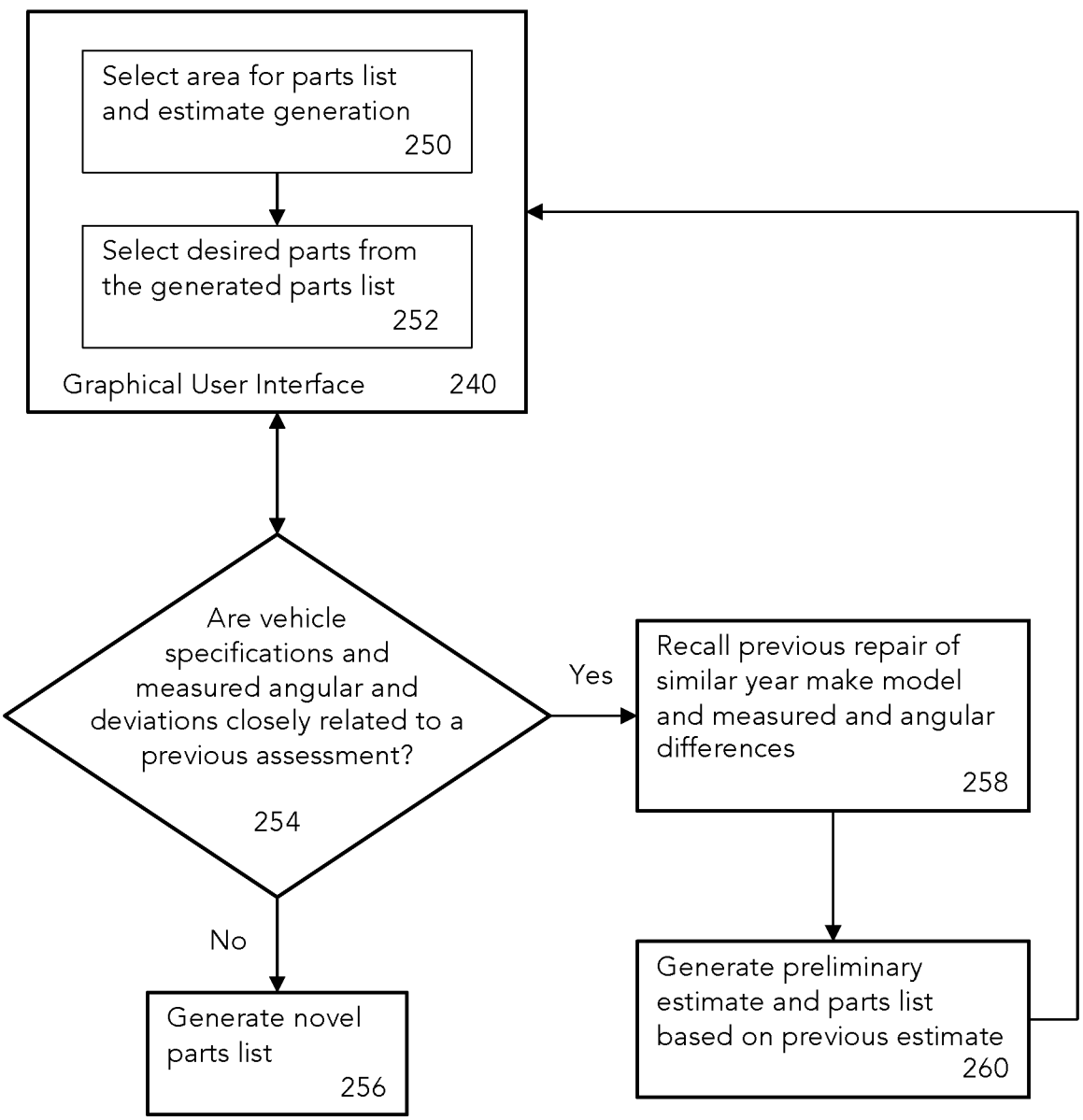
FIG. 9 is an example of a block diagram showing a method within the processing system when the damaged vehicle is matched to a vehicle with similar damage to generate a parts list and estimate on a new repair.

FIG. 9 is an example block diagram showing a method within the processing system when the user selects an area of the vehicle to generate a parts list on a new repair. To create an estimate for the damaged vehicle the user will choose the year make and model of the vehicle, then select the area for repair (front, sides, back etc.) based on the area of the damaged vehicle as identified by the point cloud variance compared to the OEM standard. From there, in an embodiment, the software will show different portions of parts of the vehicle from the desired area of repair, in one embodiment starting from the outermost parts relative to the damaged area, and will then move in sequence to parts that are attached to the first shown parts, and then internal parts. In another embodiment the software will identify the epicentre of damage based on the heat map or greatest relative deviation of points in the point cloud and proceed outward to areas of less damage or less deviation from OEM. Thresholding what is considered to be the damaged area based on percentage or absolute deviation from standard can also result in an estimate consideration list, optionally ranked by degree of deviation. In the case where the system identifies a similar vehicle with similar damage the existing estimate from the similar vehicle can be brought forward with parts and repair already selected, and the technician can simply confirm the required work based on the point cloud deviation at the damaged area without having to review each part and each section individually. This greatly expedites and simplifies the estimate process using accurate laser scan of the vehicle and reduces time and effort at the automotive shop before the repair is agreed upon by the vehicle owner or insurance company. Additionally, any unexpected work reported for the matching damaged similar vehicle in the database in the repair of the similar vehicle can be brought forward in the estimate as work that may be required, providing further accuracy to the repair estimate. An estimate for the repair of the vehicle can also be created by choosing the parts required for repair, and the system can add the times needed for repair and implement the times into a monetary cost for the repair as well as estimate incidental damage related to the damage estimate. The software can also recall estimates based on previous like damage of similar year, make and model vehicles from a damaged vehicle database to preliminarily populate a parts list and/or estimate based on past vehicle repairs of a similar type to a similar vehicle. Additional to the estimate of the vehicle, the OEM repair procedures that are required to be adhered to by the OEM can be populated for any procedure that is required for the repair of the vehicle. For example, if the technician is required to replace a part for the repair of the vehicle, and this repair is written in to the estimate, the OEM database or other external repair database can have specific steps and procedures the technician needs to follow in order to repair the vehicle back to the OEM standard.

In use, on a graphical user interface 240, the user or system automatically first selects an area of the vehicle to generate a parts list on a new repair 250. The user can also choose a specific area of the vehicle, for example the front end, and the bumper/grill assembly will populate first, with all parts spread out so the technician can see and choose each part, where each part is preferably indicated with the degree of damage from standard. Alternatively, parts having damage beyond the set threshold can be selected automatically, with other parts near or under the threshold optionally selectable by the technician. After the area for parts list generation is selected the parts are selected from the generated parts list 252 the processing system communicates with the processing system to check if the vehicle specifications and measured angular and deviations closely related to a previous assessment 254. In particular, if a parts list has already been generated by another user or in another repair of another vehicle of similar year, make, model and angular and measured damage, a similar parts list may apply to the current repair. Upon selecting an area for generating a parts list on a new repair 250 the processing system will first ascertain if there are vehicle specifications and measured and angular specifications closely related to a previous assessment 254 by recollecting saved data that has previously been saved and stored on the processing system and associated memory. If yes, then the system will recall a previous repair of similar year make model and measured and angular differences 258 and generate a preliminary parts list and estimate based on the previous repair 260. For example, the system will recall the previous repair of similar year make model and measured and angular differences and dedicate this as the generated parts list for the new repair. Otherwise, the system will generate a novel parts list 256. Once the parts list is generated the user or technician can then review the generated parts list and select the desired parts from the generated parts list. In both cases the parts list and reports are saved on the processing system for future recall and parts list generation.

For each selected part, the system can then suggest a labor time/cost to replace that part and the part cost, adding both to the estimate. In an example, if the part needs to be painted, the system will ask if the part just needs to be clear coated, or base and clear coated, or applied with any other product needed for finish or to obtain factory finish standards as desired. The user can also choose the part displayed on the screen and choose not to replace the part, but to repair it instead. Repair of a specific part can include, for example, alignment repair, structural reinforcement repair, calibration, and incidental exterior deviation repair. In the case of a coating requirement, the user can choose what painting procedures need to be completed on that part. After the user runs through the list and diagram of the first set of parts, they can navigate on the graphical user interface to a part of the user software showing adjacent parts behind the first set of parts. The process is repeated until the user finishes the estimate of repaired or replace parts that return the vehicle to the OEM standard of safety. Additionally the user can provide additional estimates for adjacent parts and/or panels that may have sustained incidental damage where repair is optional.

Based on the matching of the damaged vehicle to a previously assessed vehicle a preliminary but relevant estimate and parts list can be prepared based on repair work done on the previously assessed vehicle 260. The estimate can take into account the cost of any replacement parts, the labor required to do the repair, the cost of incidental materials such as paints and adhesives, the refinishing cost, any disposal costs, and any other costs relating to the repair which was done on the previously damaged vehicle as reported in a damaged vehicle database. The estimate can be generated with the aid of a software system that stores, for example, the repair procedures, parts, and time required for a vehicle component repair or replacement on a previous vehicle with similar damage, and the graphical user interface 252 can be used to display vehicle parts from a parts list, suggest repairs, and provide deviation data on the damaged vehicle. This preliminary estimate can be provided to the technician for fine tuning based on the damaged vehicle for repair. The prepared estimate comprising an indication of vehicle damage and a full listing of required and optional repairs with a cost estimate of parts, labor, and incidental costs, can be created for the insurance company and vehicle owner.

Figure 10:
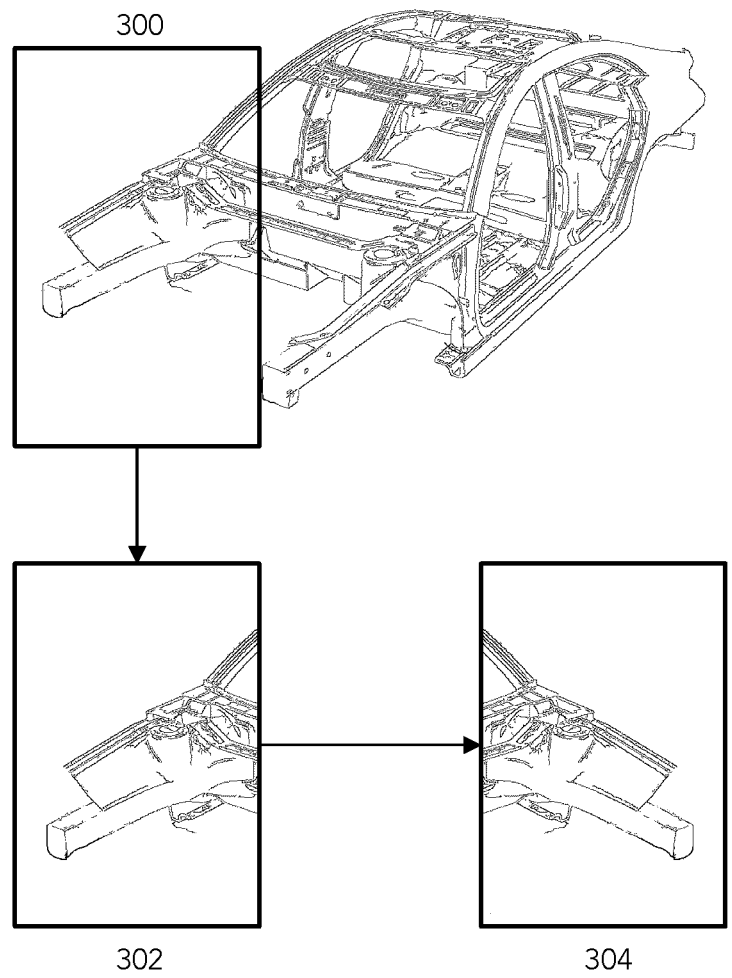
FIG. 10 is an example of an inverted point cloud cluster shape of an undamaged side of a damaged vehicle.

FIG. 10 is an example of an inverted point cloud cluster shape of an undamaged side of a damaged vehicle. In another application of the present system and method, the 3D imaging scanner can be used for scanning a side of a vehicle to obtain a point cloud shape and inverting the points within the point cloud shape to represent and exact opposite version of the scanned area and that represents the components of the opposite side of the vehicle. The inverted section of the scanned point cloud shape can then be used to overlay with a scanned point cloud shape of the exact opposite side of the exact parts that relate to the opposite side of the vehicle. An image is shown of a selected area of the point cloud cluster 300 of the damaged vehicle point cloud shape and the undamaged that a user may wish to use for a comparison of each side of the vehicle. This may be useful if there is no archival data of an undamaged vehicle point cloud shape within the server or processing system and when the user would like to assess the extent of damage done to a single side of a damaged vehicle. The user can isolate and select an area of the undamaged baseline point cloud shape of a isolated area on a vehicle 302 and invert the points within the isolated gathered point cloud cluster to represent the shape of the vehicles components that are on the opposite side of the vehicle from the inverted isolated area 304. This inversion of points will create a point cloud cluster shape in the inverted isolated area 304 that can represent the components of the opposite side of the vehicle. The user can then take the inverted isolated area 304 and overlay a scanned point cloud cluster shape of the damage side of the vehicle over the inverted isolated area 304. Once the inverted isolated area 304 and the damaged scanned point cloud shapes are overlaid the user can perform various functions. These functions are the same functions that the user could perform on a point cloud overlay of a baseline vehicle point cloud shape and damaged vehicle point cloud shape describe in previous embodiments such as labeling of points and comparing points and generating a parts list. As the inverted point cloud shape of the undamaged area of the vehicle is overlaid with the scanned vehicle point cloud shape of the damaged area the differentiating points can be of a different color and considered to the user as damage as described in previous embodiments.

Figure 11:
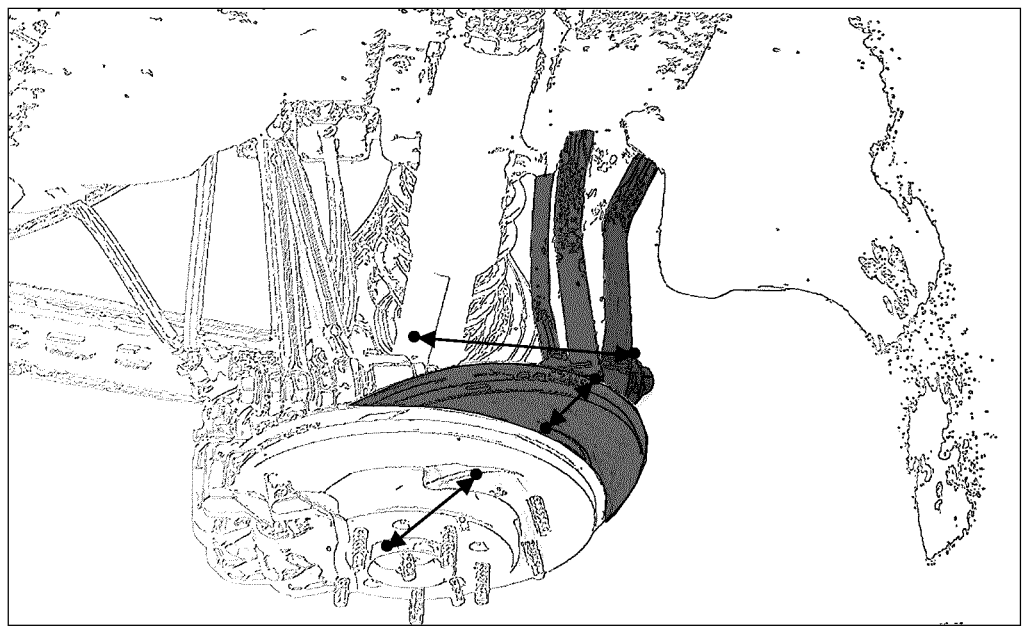
FIG. 11 is an example of a point cloud overlay of the suspension components of an undamaged side of the vehicle with the damaged side of the vehicle.
Figure 11:

FIG. 11 is an example of a point cloud overlay of the suspension components of an undamaged side of the vehicle with the damaged side of the vehicle. Shown is an inverted point cloud shape of an undamaged area of a vehicle that has been overlaid with a scan of a damaged point cloud shape that relates to the damaged side of the vehicle. In particular, the parts shown of a suspension component of a damaged vehicle with the damaged part overlaid over the vehicle part standard. The point cloud overlay is created by aligning the scanned geometric point cloud data shape of the damaged vehicle onto the inverted point cloud shape of the undamaged side of like components to the damaged area of the vehicle. The processing system locates like points within the two point cloud of each shape and aligns them based on like geometric edge patterns, smoothness and curvature. Outlier points are preferably represented as a different color and can be assumed to be the damaged area of the vehicle. This point cloud overlay is then stored onto the processing system and shown on a digital display or graphical user interface. The represented point cloud overlay is also interactive to the user, allowing them to perform certain functions like, but not limited to, manipulating the shapes in 360 degrees and zooming in and out. Additionally, the user can place points for reference measurement differences onto the point cloud overlay and the damaged point cloud cluster of outlier points. Quantified measured differences can be displayed. By choosing like points that represent the same specific area of the vehicle and damaged area to display, a numerical value of measurement of angular differences and measured distance differences that represent the point cloud cluster of damage can be displayed. This represented damage will display a numerical value correlating to the deviation differences of point cloud points from the undamaged vehicle point cloud shape to the scanned point cloud cluster of the damaged vehicle based on an x,y,z cartesian coordinate system with a scale of reference to provide absolute deviation measurements. Additionally, the user can allocate a label for each point of differentiating reference measurements that can then be displayed on a table or graphical display that can be printed, saved, or sent as a transferable computer file. The results of inverting a point cluster and then overlaying it with a scan of the damaged area of a vehicle point cloud shape can allow the user all of the same functionality of previous embodiments and allow for reporting.

The imaging system taking a point cloud dataset from the damaged part together with the image processing system can also automatically compare the damaged vehicle to an image standard and visually represent the overlay on the vehicle standard to show the difference in position to the technician with relevant reference loci. In this case the reference loci from the damaged vehicle and the vehicle standard are compared and the distance and angle of offset are calculated. The reference loci are compared at two matching equivalent positions, one on the reference vehicle standard suspension part and the other on the damaged vehicle suspension part. A visual representation of the comparative vehicle overlay of the damaged and undamaged vehicle suspension component is provided to the technician. The system automatically overlays the images and represents the differences as a difference in color, shading, outline, as a heatmap based on degree of deviation, or other visual difference. In an embodiment the user can also select a reference point for comparison between the damaged and undamaged part or component or vehicle if they would like to investigate further. The image processing system can then calculate the angles and measurements of deviation. From this information the user can, for example, choose an option in a graphical user interface (GUI) that can determine the angles and measurements for repair, or suggest to the user that the damaged parts need to be changed.

Figure 12A:
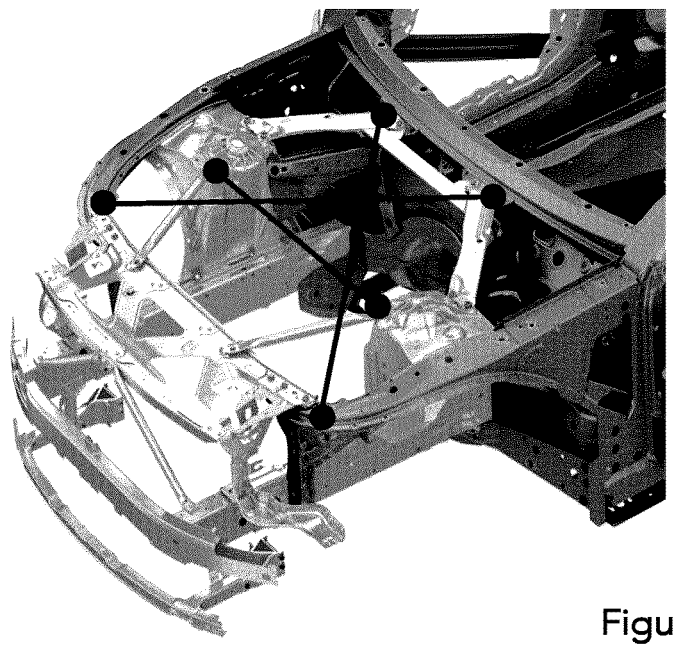
FIG. 12A is an image of a vehicle structure with factory specification reference loci.
Figure 12A:
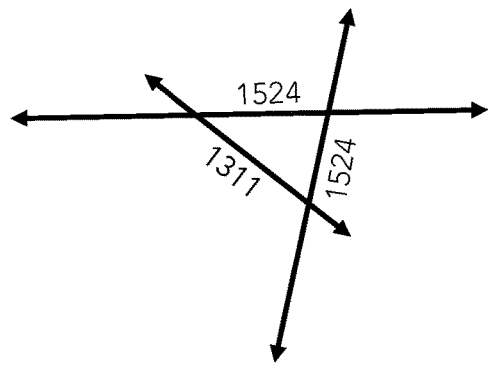

FIG. 12A is an image of a vehicle structure with factory specification reference loci in a point cloud. The image of the undamaged vehicle is an image or source 3D composite image file representative of an undamaged vehicle. Measurements points also referred to as reference loci show x,y,z coordinate differences in distances and angles, and reference loci can optionally be selected in advance as points of reference on the standard vehicle. The reference loci can be chosen by the user, automatically assigned in the vehicle database, selected by the image processing system according to rules, or a combination thereof. The simplified point cloud shown provides the distances of reference loci in the vehicle, as well as angles between reference loci on the vehicle. In one example, the distances are provided on the right as the expected standard distances between reference loci in an OEM vehicle.

Figure 12B:
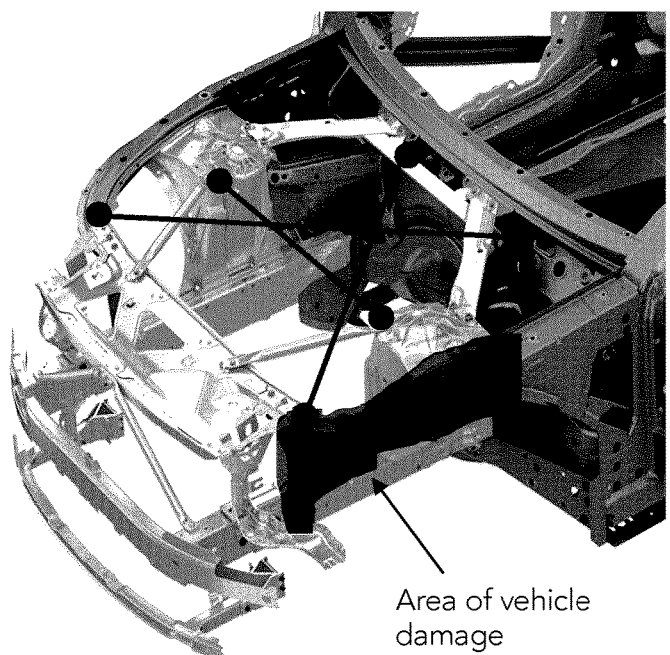
FIG. 12B is an image of a damaged vehicle structure with reference loci.
Figure 12B:
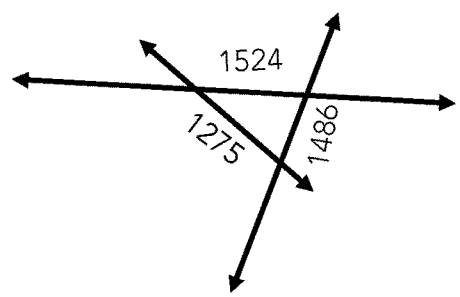

FIG. 12B is an image of a damaged vehicle structure with the same reference loci as shown in FIG. 12A. The image of the damaged vehicle is a digital image is generated by an image processing system from the data obtained from a imaging system. The area of the vehicle damage is shown with a darkening in color of the structural region. The reference points can be compared manually to the reference points in FIG. 12A to determine the extent, angle and measurements of deviations between the two images and image dataset. As shown, the angles as well as distance from the corresponding reference loci in the damaged vehicle indicate that a misalignment event has occurred that requires repair. From these calculations the technician can determine the requirements, parts, and methods of repairs. The technician can also determine the anchoring points of the tooling repair system. Similarly, the technician can determine the required jig anchoring point to anchor the vehicle to the frame repair machine. The image processing system can further provide a realignment process protocol to realign the damaged vehicle components and structures. The image processing system can also indicate when the component or structure deviates in distance and/or direction beyond a reasonable tolerance and is therefore beyond repair. The relative coordinates at the reference loci provide distance and angle values corresponding to the respective damage at the respective locations on the vehicle. The relative differences are then used to determine specific information for one or more suggested anchoring point for pushing or pulling the components back to an undamaged state as well as reorientation tooling and techniques and repair protocols to provide the user with one or more suggested steps to reorientate the damaged area. The reverse angle of damage is suggested to pull or push for reorientation. A quantified value measurement of reorientation, such as, for example, direction, tool speed, applied force, and distance, or a combination thereof, can also be suggested.

Figure 13:
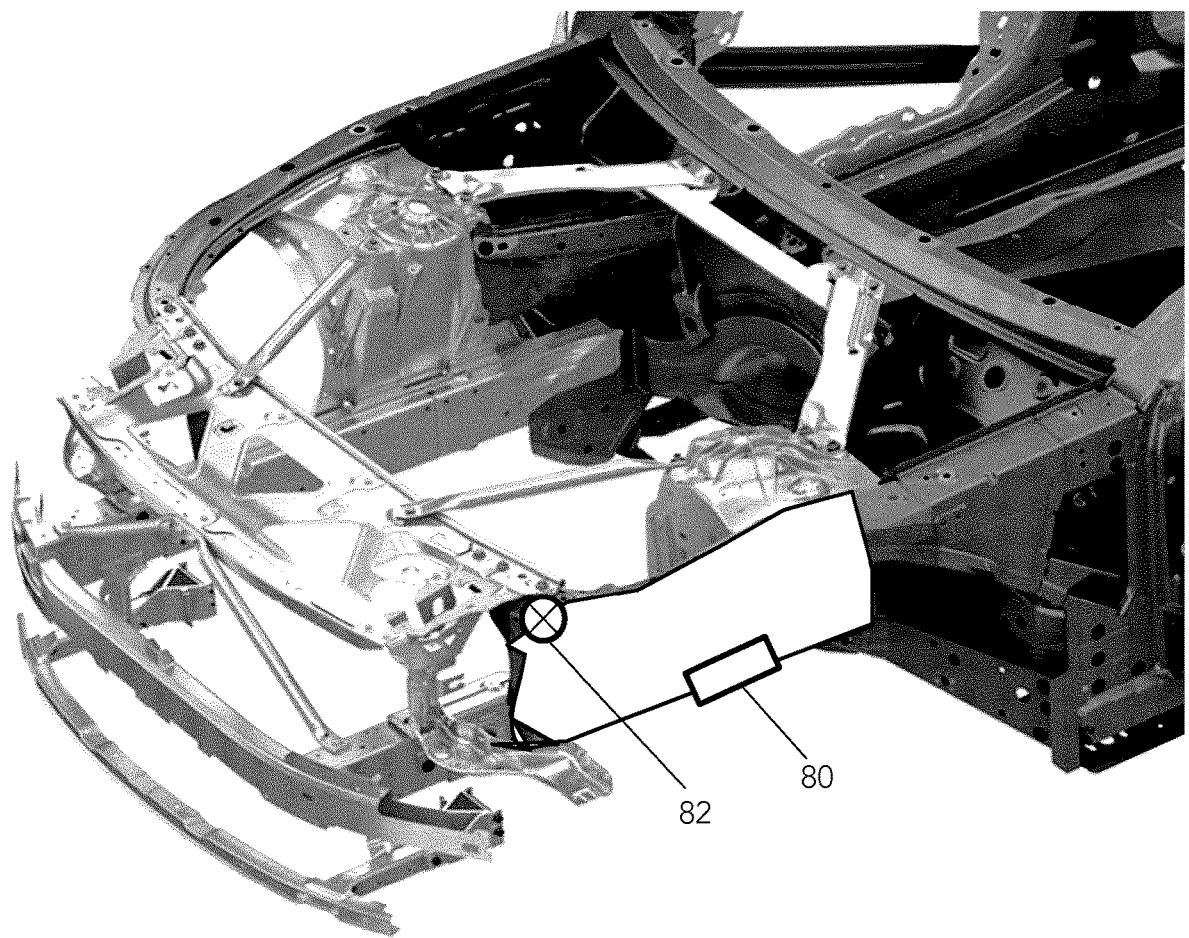
FIG. 13 is an image of a damaged vehicle with a suggested tool and jig anchoring point.

FIG. 13 is an image of a damaged vehicle with a suggested tool anchor point and jig anchor point. In this image the bright area indicates the location of deviation or damage in the damaged vehicle, with the other parts of the vehicle structure substantially undamaged. The image processing system automatically matches similar points from each of the undamaged and damaged vehicle dataset and both files are matched and overlaid accordingly. The image processing system then shows the differences of the image overlay as a damaged area which is represented as a specific color, shading, or outline. The damaged area can be represented in colors that represent the extent of damage and correlating repair suggestion, similar to a heat map. In one example a specific color can represent the damage that is within tolerances set out by the insurance provider or manufacturer that does not need to be repaired, such that one color can represent the damaged area reflective of a measurement and angle that is suggestive of a need to repair. In another example, another color can represent the damage area reflective of a measurement and angle that is suggestive of a need to replace the damaged component. Jig anchor point 80 provides a suggested location for anchoring the vehicle component during alignment, while tool anchor point 82 provides a suggested location for anchoring a pulling or pushing too. Based on the calculated reference loci a repair protocol is suggested by the system to provide reorientation and tooling techniques based on the comparative data of the digital composite images of damaged vehicles. The image processing system will then suggest the angles and measurements needed to move the damaged area back to its original state.

Furthermore, the image processing system will suggest the optimal placement for the anchoring of the tooling and the placement of the jig anchoring system.

Figure 14A:
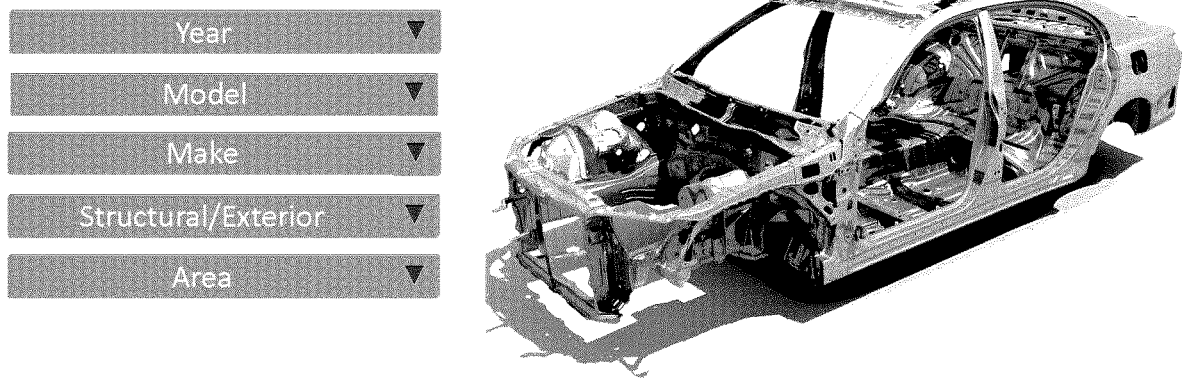
FIG. 14A is an image of a graphical user interface for selecting the standard vehicle for comparison.

FIG. 14A is an image of a graphical user interface for selecting the standard vehicle for comparison. The user can manually choose the vehicle type by vehicle year, make, model of the desired vehicle to scan. Alternatively the imaging system can take the imaging data and make a suggestion of the same based on a comparison of as well as an interface to choose the desired area of comparison for repair suggestions. In another alternative the VIN number or OEM specific barcode on the vehicle can be scanned and the software can automatically decode and fill in the year make and model of the damaged vehicle. The user can then pick the desired function of the software and then the area of damage for comparison. The imaging system can begin to scan the damaged vehicle once the vehicle information is entered into the software and images can be taken either manually, automatically, or a combination thereof to collect reference loci to build the point cloud. Upon completion of the imaging scan the software will automatically overlay the damaged and undamaged files for comparison.

Figure 14B:
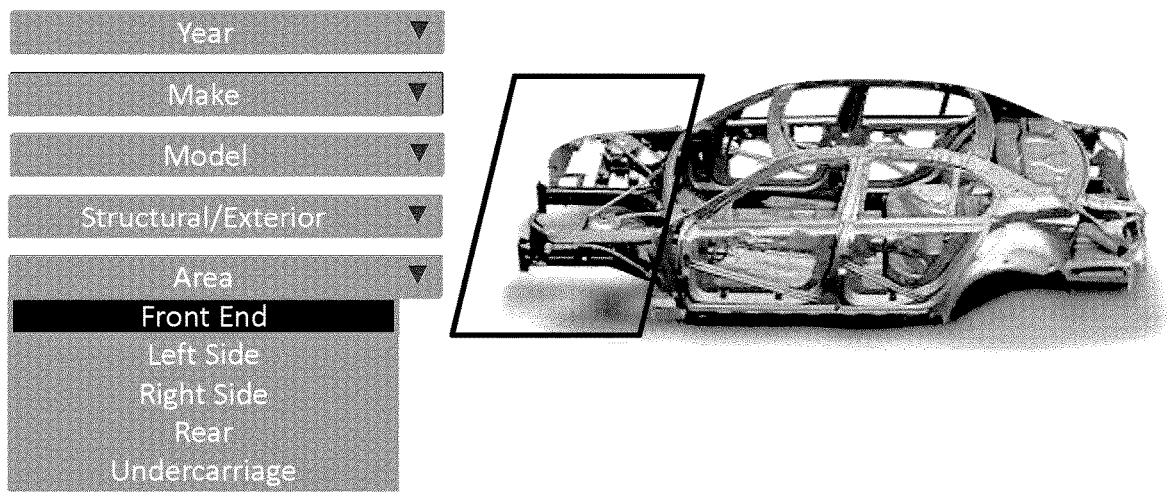
FIG. 14B is an image of a graphical user interface for selecting the standard vehicle for comparison and the region of damage on the damaged vehicle for selecting the relevant reference loci.

FIG. 14B is an image of a graphical user interface for selecting the standard vehicle for comparison and the region of damage on the damaged vehicle for selecting the relevant reference loci. The area of the desired area to scan can then be chosen and optionally highlighted by the system. The user can also be provided with an option to scan the exterior for fit and finish, or the structure for damage. The measurements can then be done automatically or manually via point and click. Shown is an example of a user graphical interface for selecting the specific area for comparison. The user can select from various area of the vehicle where damage is located, for example but not limited to the front, rear, left or right side, undercarriage, and exterior or body. The user can also choose a vehicle in its entirety for comparison.

Figure 15:
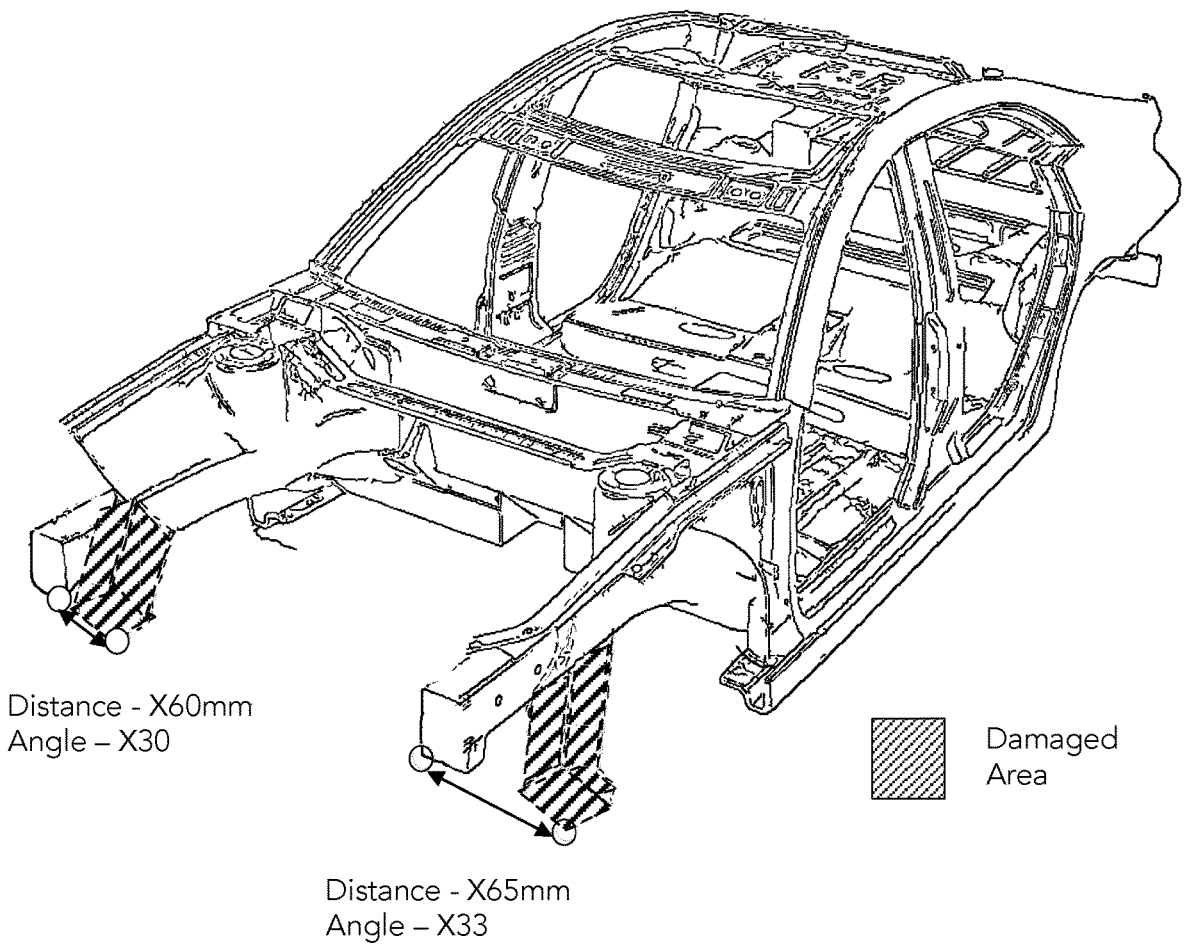
FIG. 15 is a point cloud image of the damaged vehicle overlaid with the vehicle standard at the location of damage with angle and distance deviation according to relevant reference loci.

FIG. 15 is an overlaid image of the damaged vehicle overlaid with the vehicle standard at the location of damage with angle and distance deviation according to relevant reference loci. An image overlay of a damaged and undamaged vehicle with reference points is shown for comparison. The image processing system will calculate the angles and units of measurements of deviation between the points and matching reference points on the undamaged vehicle dataset and the damaged vehicle dataset are selected in order for the processing system to calculate the differences. The image processing system will then calculate the angles and measurements needed to repair the vehicle back to its original state based on x,y,z coordinate measurements and the recommended tooling and jig anchoring points will be provided by the system. Once the damage is assessed the system will provide the relevant point cloud coordinate information to the user on the computer screen. The data can be depicted with a 2D vehicle map or 3D vehicle in the form of deviation measurements. The system can then provide adjustment angles and distances that each component needs to be adjusted to repair the vehicle to an acceptable state. The angles and distances provide the user with guidance on how to repair the vehicle and reverse the damage. In order to reverse the damage in a timely fashion it is often beneficial for the technician to understand the angles of deformation as well as the required angles for repair. Furthermore, by understanding the angles for repair, the user would then know how to set up the tooling for pulling the frame of component back to its original state. By seeing and understanding the damage, the software could then suggest where to anchor the tooling, such as the pulling tower, and what angles to pull the components in order to obtain its original state.

Once the vehicle has been anchored at the recommended anchoring points the frame or structural damage can repaired by attaching a pulling tower or power post assembly to a point on a vehicle frame or unibody structure and actuating a hydraulic ram to pull the deformed portion of the frame and body into alignment. The system provides the location and coordinates of the external tower position, and can optionally recommend a particular tower configuration using known parts from the jig system. By performing a series of pulls, the chassis including the frame or unibody may be returned to its proper dimensions and alignment. The location of the jig attachment point to the vehicle, location of the tower, positioning of the jig on the tower, as well as speed and applied force can be suggested by the system as part of the repair protocol. Bench jig systems with universal jigs and laser measuring or additional input from the imaging system can further confirm the correct location of the external jig and tower and positioning and angle of the applied force for repair. A plurality of pulling towers can also be used simultaneously exert pulling forces on a vehicle from multiple directions, with several pulling towers being positionable at various positions relative to the vehicle. The imaging system can also assist with confirming the proper position of the external towers. In one embodiment, the push repair system can comprise a piston powered extension device that will create pressure from a point not on the vehicle to the damaged area of the vehicle that will push the damaged area back to its original state. In one embodiment, the pull repair system can comprise an arm that is pressed by a piston type extender in the opposite direction of the damage, pulling away from the damage. Each of these are typically secured to the vehicle by a chain and tooling anchoring device. The present system and method can be used for structural damage, vehicle frame damage, part or component damage, assessment of structure or component integrity, suspension damage, as well as for body or dent repair. In the case of component parts that may be more easily replaced, the present system can also evaluate a particular component or part and make a recommendation of whether the part needs to be replaced or can be repaired.

Figure 16:
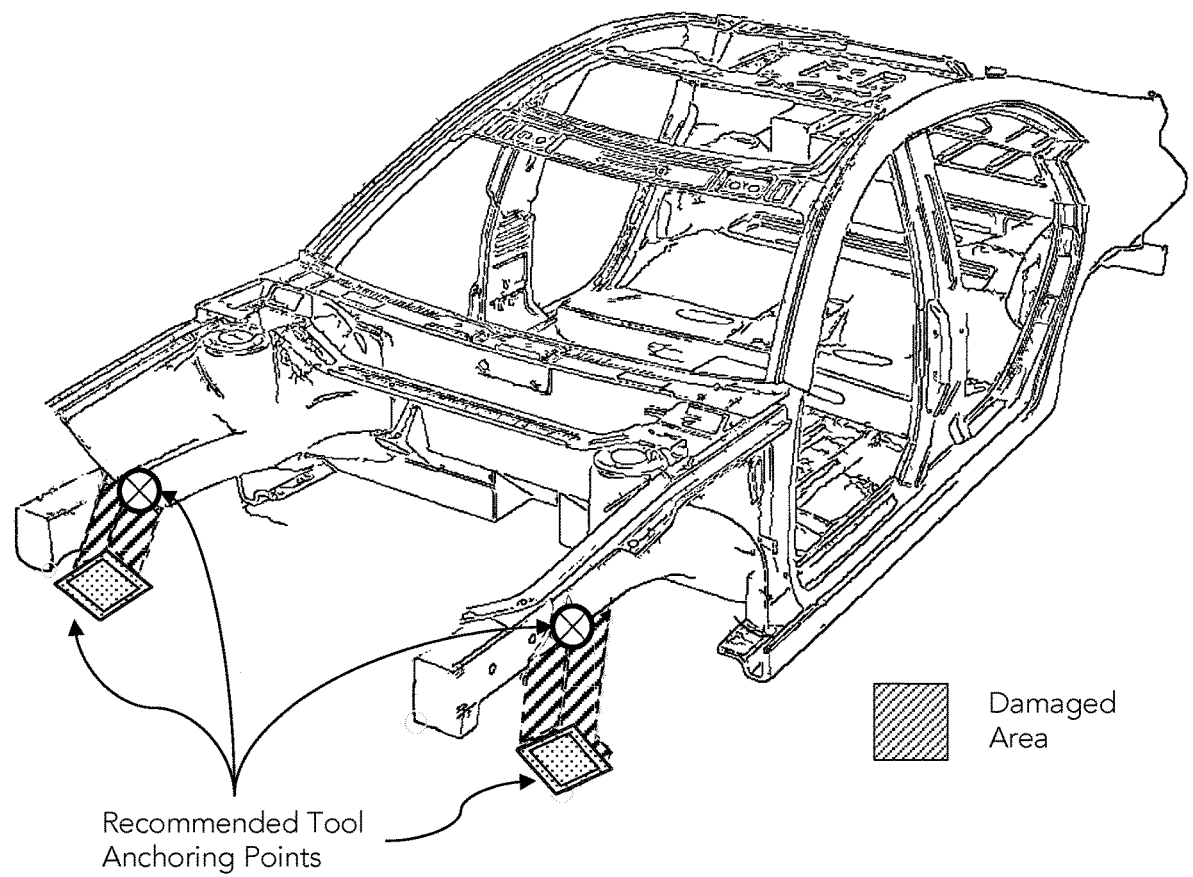
FIG. 16 is a point cloud image of a damaged vehicle overlaid with the vehicle standard showing recommended tool anchoring points.

FIG. 16 is an image of a damaged vehicle overlaid with the vehicle standard showing recommended tool anchoring points. a damaged vehicle overlaid with the vehicle standard showing recommended anchoring points for repair tooling and jig anchoring systems. This overlay can be automatically executed by the image processing system. The image processing system can automatically suggest anchoring points for the repair tooling system. The repair tooling system could embody a push or pull repair system that is best fit for the specific repair. The image processing system will also suggest anchoring points for the vehicle anchoring jig system. The vehicle anchoring jig system could embody a universal system that can be created by the user based on a series of fixtures, or it could embody a standard system that was created specifically for the desired vehicle and location of anchoring.

Figure 17:
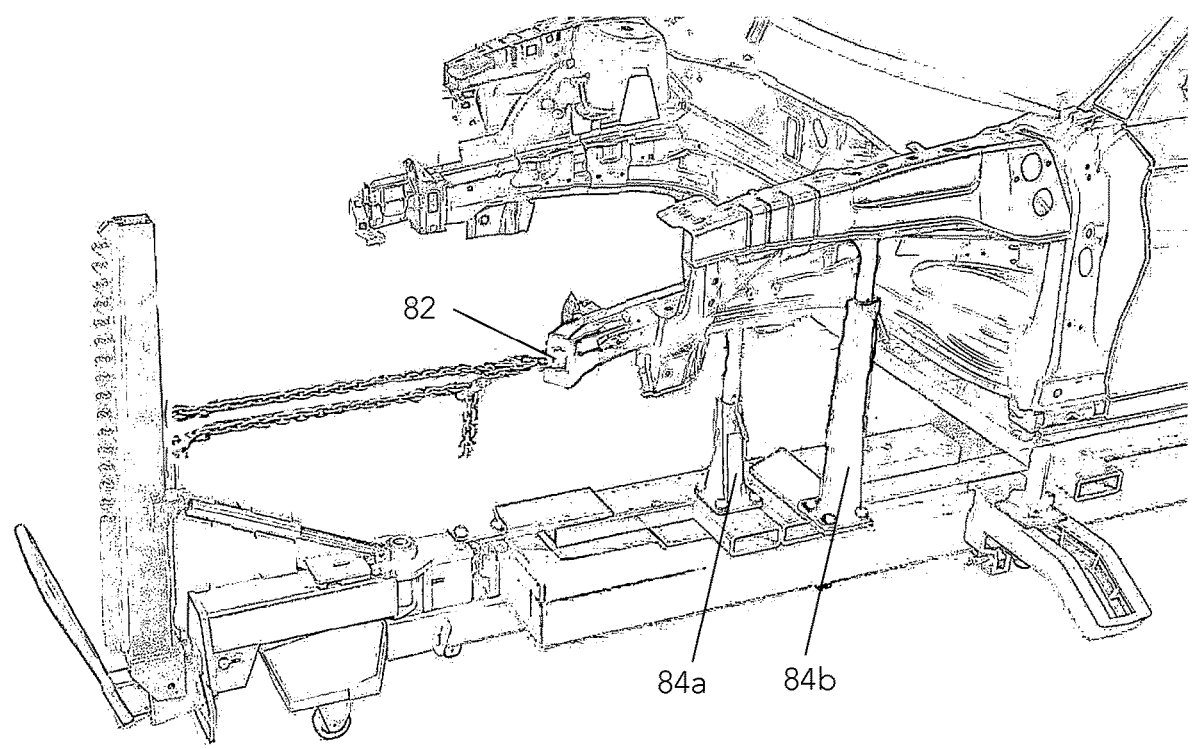
FIG. 17 is a point cloud image of a vehicle anchored to a bench with a tower.

FIG. 17 is an image of a vehicle anchored to a bench 88 with a tower 86 and with an attached jig for vehicle repair. Alignment jig and bench repair systems with anchoring and mounting functions can provide multi-thousand pounds of pulling force to mounted or anchored vehicles for structural collision repair to the vehicle leading to an efficient and precision repair process. A jig system or bench jig is essentially an anchoring system for a vehicle that anchors the vehicle to a bench frame to provide support for a pulling (or pushing) force to realign the vehicle or vehicle part. Once the vehicle is stabilized on the jig system at a number of undamaged areas on the vehicle structure a hydraulic assembly can be attached to the damaged area to provide the pull or push force to realign the damaged section. In this way the jig system allows the technician to adjust the damaged areas only; when firmly anchored to the bench 88 system the vehicle will not move where it is anchored and only the damaged area can be manipulated. Functionally, the jig system creates a stable point that cannot be moved and is essential to assure that only damaged areas are being moved when the pulling force is applied. In practice, the vehicle is secured to the bench at various locations to resist the force applied with the pulling arm at the tool anchor point 82 and jigs 84a, 84b attaching the vehicle to the bench 88. Jig 84a anchors the vehicle between the tool anchor point 82 and a location behind where the vehicle is otherwise in a non-damaged condition. The location of the jig anchor point closest to the tool anchor point 82 is preferably suggested by the present system, and can be either in a predetermined anchoring location for use with a jig set specific to the vehicle, or can be placed with a universal or flexible jig set wherein the placement is not restricted to a particular location. When a jig set specific to the vehicle is used, the combination of jig set and bench system often prescribes where jigs can be placed on the vehicle and bench. In the case of a single step repair protocol, the jig should be placed behind the area of damage. In the case where the system recommends a multi-step repair protocol, each of the steps can provide jig and tool anchoring locations specific for each step. Providing a multi-step protocol can reduce overapplication of force in the case of a more significant realignment procedure and thus avoid any additional damage which may further reduce the strength of the realigned part.

Figure 18:
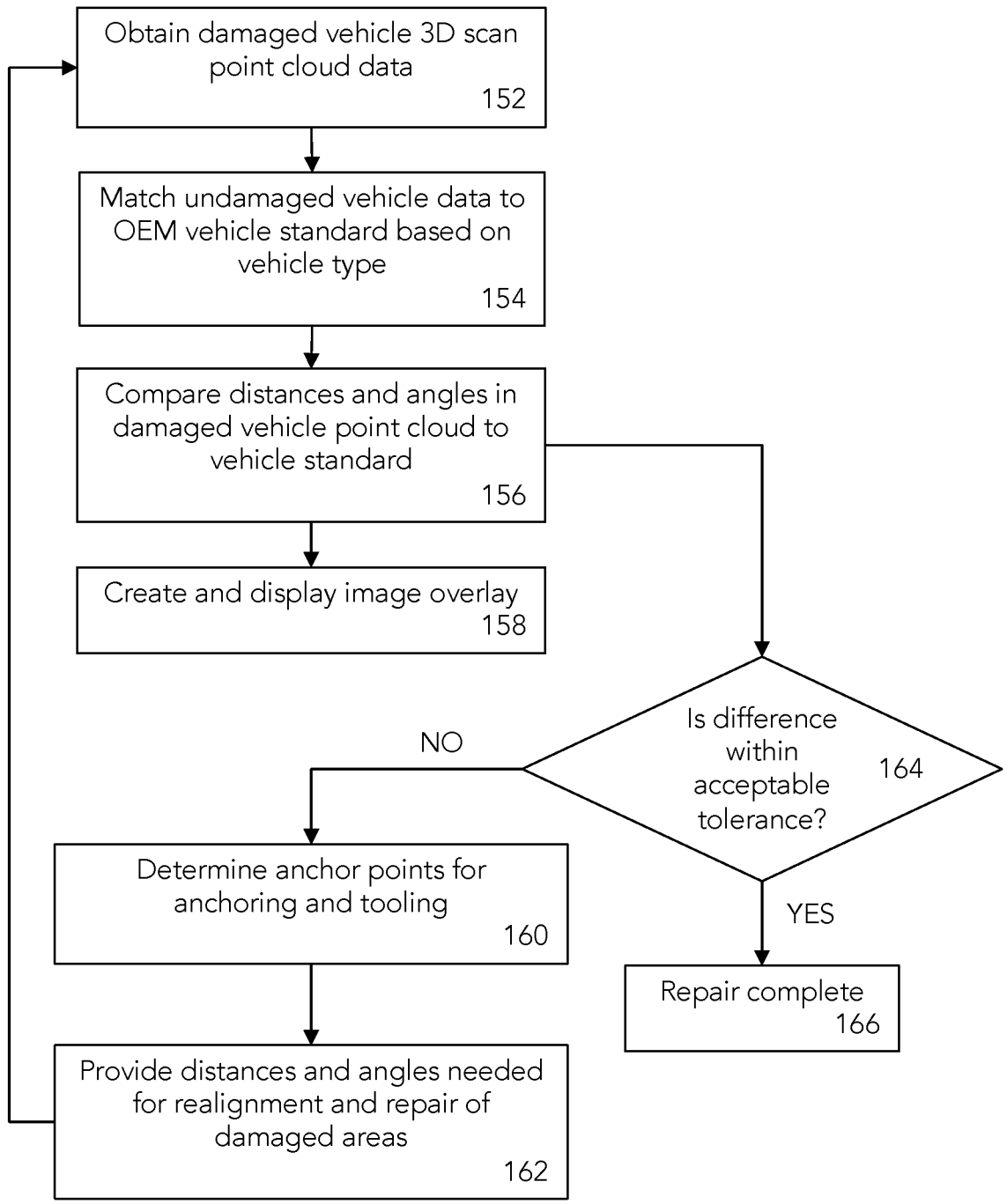
FIG. 18 is an example method flowchart for an assessment and repair protocol for a damaged vehicle.

FIG. 18 is an example method flowchart for an assessment and repair protocol for a damaged vehicle. First a imaging system obtains 3D scan point cloud data for the damaged vehicle 152. The imaging system can be used to read and record a series of measurements, which are then compared with manufacturers' published vehicle dimension specifications. This enables determination of the severity of structural and under-body damage and mapping of its variance to the vehicle standard in various locations. The scan data can be of the whole vehicle, or only part of the vehicle that is damaged. The scan provides a point cloud map characterizing the location of components of the damaged vehicle in the area of damage. The damaged vehicle is then matched to the original equipment manufacturer (OEM) vehicle standard of an undamaged vehicle of the same type from a vehicle database 154. The vehicle type for comparison can be selected, for example, by identification by the technician of the damaged vehicle make, model, year, and features. Alternatively, the imaging system can provide a characterization of the undamaged areas of the vehicle and the same can be matched to data in the vehicle database to provide a suggested vehicle type match. Once the damaged vehicle has been matched to an OEM standard for the same vehicle type the image processing system can analyze the scan data to detect distances and angles on the damaged vehicle and compares them to the same points on the vehicle type from the vehicle database 156. Particularly, the distances and angles in the point cloud from the damaged vehicle scan data are compared to the point cloud of the OEM vehicle of the same type. The system then interrogates the two data files to determine if the damaged vehicle is within an acceptable tolerance 164. An acceptable tolerance can be measured in less than a certain angle of deviation from standard, less than a certain degree or distance from standard, or combination of both. In one consideration, if a specific part is damaged that is known to be highly sensitive, the system can have a lower tolerance for deviation compared to a part that is less sensitive to deviation. This analysis can be done at the first instance of vehicle damage assessment, or other times during the vehicle repair or realignment process.

The image of the damaged vehicle, or damaged part or component, can then be overlaid with the same OEM vehicle or OEM part or component and displayed 158. This provides the technician with a clear view of the extent and location of damage, and a visual indication of how the component or part can be realigned so that it is as close to the OEM standard as possible. The image can be black and white, greyscale, or have color as desired. The damaged section of the vehicle can also be color-coded with a heat map showing the extent of damage, where certain colors (or shading) are indicative of distances of deviation from the vehicle standard. In cases where the system makes a determination that the damaged component is irreparably damaged the system can also provide an indication to the technician that complete replacement is recommended. Anchor points can then be determined for anchoring the vehicle to a bench jig and for the anchoring a tool to the vehicle to support controlled tooling 160. The distances and angles needed for realignment of damaged areas are then provided to the technician 162 as a repair protocol for realignment and repair of the vehicle. The repair protocol can be provided as a single recommendation including one or more of force required, distance of adjustment, and angle of adjustment, or as a series of steps to carry out the same protocol, with each step including one or more of force required, distance of adjustment, and angle of adjustment. Once the imaging system determines that the vehicle is within an acceptable tolerance the repair can be deemed complete 166.

Figure 19:
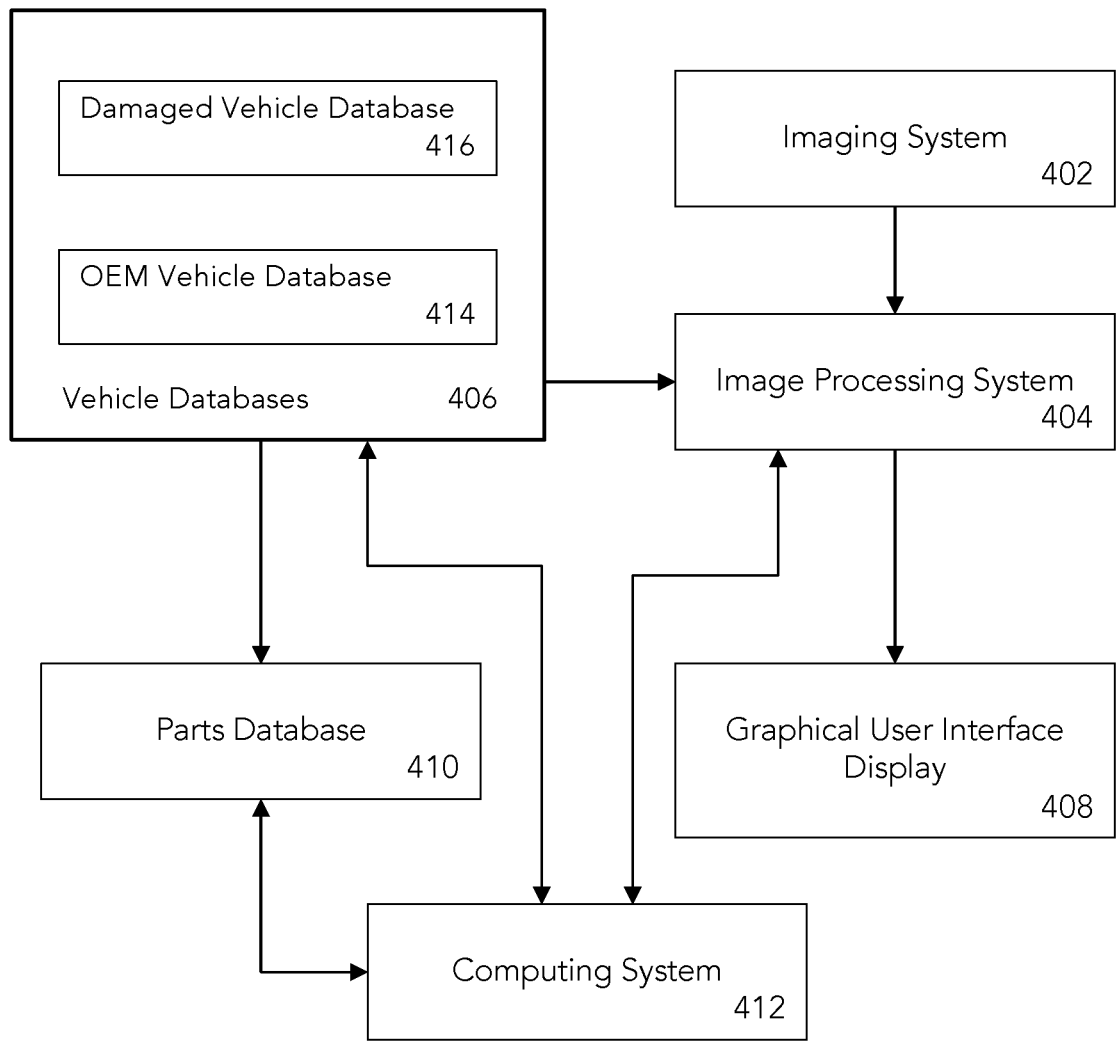
FIG. 19 is an example diagram of the vehicle structural damage assessment and repair system.

FIG. 19 is an exemplary diagram of the vehicle structural damage assessment and repair system. A 3D imaging system 402 captures a 3D scanned image of the damaged vehicle or damaged component of the damaged vehicle as a point cloud. The set of vehicle databases 406 comprises a plurality of 3D datasets for a plurality of vehicles identified by vehicle type, and comprises or is connected to an OEM vehicle database 414 which contains OEM data files of a plurality of vehicles identified by make, model, and year. Additionally, the set of vehicle databases comprises or is connected to a damaged vehicle database 416 contains 3D datafiles of previously damaged vehicle together with a previously prepared estimate as well as a reporting of work done on the vehicle including actual parts used, labor cost, and incidental costs. The OEM vehicle database and damaged vehicle database can be the same database or different databases. Both databases are preferably accessible in the cloud so that multiple automotive repair sites can access the database of vehicle repairs that have been done using the present system, and not only those done at their site. The software will save and store the estimates prepared on previously damaged based on year, make model in a damaged vehicle database together with scans of the previously damaged vehicle. As a new damaged vehicle is scanned, the system can compare the measured and angular deviations compared to the OEM vehicle in the OEM vehicle database 414 to a like vehicle year, make, and model of a previously damaged vehicle in the damaged vehicle database 416. If the deviations in the damaged vehicle for repair are similar to a past scanned and estimated vehicle, the system can automatically populate the estimate of the previously scanned vehicle from the damaged vehicle database 416 for editing by the technician. As the system accumulates similar estimates based on the angular and measured deviations in the point cloud it can compare each estimate of like year, make and model of other vehicles with similar angular and measured deviations to learn the most frequently submitted items for estimate to create more and more accurate estimates for repair based on the like angular and measured deviations of a vehicle.

The image processing system 404 compares the 3D dataset of the damaged vehicle or component to the same vehicle or component from a vehicle standard of the same type from the OEM vehicle database 414. A display 408 or graphical user interface then provides an overlay of the damaged and undamaged vehicle, either in a 2D or 3D format, optionally also displaying deviation measurements of the damaged vehicle or component to the standard. The system can further comprise a deep learning system such as a convolutional neural network, which has been trained on a large number of images of damaged vehicles and corresponding information about damage, such as its extent and location on the vehicle. Comparison of the vehicle damage to other datasets of damaged vehicles can be used in order to learn to assess damage and provide the best protocol for realignment and/or repair. Such a pattern learning method can assess damage to the exterior or body of the vehicle, as well as the structure of the vehicle and its component parts. The assessment of damage by the image processing system can be used as input to the pattern or deep learning system in order to supplement and refine the damage assessment.

A parts matching and ordering system in computing system 412 can also be connected to the present system for determining and suggesting parts for repairing the vehicle. In particular, the present system can obtain a 3D scan of a damaged vehicle at the location of damage and match the undamaged area of the same vehicle to a database of parts that can be used to fix the damaged vehicle at the location of damage by associating the direction and measured deviation at the location of damage vehicles, optionally using an artificial intelligence (AI) system capable of associating the angular and measured differences between the damaged vehicle and a vehicle standard for automatically suggesting and ordering vehicle parts for repair. The parts can then be ordered. The artificial intelligence system can also associate the angular and measured damage of a damaged vehicle to a similar past scan of the same vehicle for reference, instead of a vehicle standard, and recommend a repair and/or suggest parts ordering based on the current damage. Feedback from the operator or technician regarding which parts are ultimately ordered or used to repair the damaged vehicle can further train the AI system to recognize which parts are most suitable for repairing identified vehicle damage. The system can thereby learn a process for ordering parts for a vehicle repair by comparing the angular and measured differences of the damaged vehicle to the undamaged vehicle differences and determining which area of the vehicle is damaged and is need of which parts for repair. In one embodiment of the parts ordering system, a suggested list can populate based on the results of vehicle scan an analysis and provide a suggested list of parts required for repair.

In an example, if a vehicle is damaged in a particular location, the system can do an evaluation of the damage and provide a protocol or guidance to the technician to repair the damage. The repair may include realignment, structural reinforcement, part replacement, or a combination thereof. As a part of the damage assessment, if parts are required to complete the repair the integrated parts database 410 can bring forward recommended parts for the repair required in the area of damage. The technician can then review the guidance and protocol recommended by the system and select which parts are required. Past repair of damage of other similar vehicles and selection of parts by other technicians can teach the system to recommend parts that are more often selected for use in the repair. The suggested list of parts can provide options based on the type, degree, and severity of the damage, taking into account the angles and degrees of measured damage on the vehicle. The technician can then select the desired part for repair, and the system can record the selection and match the selected part to the vehicle damage. The system can then store which parts were ordered for a specific data set of angular and measured differences on specific vehicles on past repairs and provide improved suggestions for parts to match particular types of damage. As the software is exposed to like vehicles with similar angular and measured differences it will be able to better determine which parts are needed for repairs. This system will allow for faster parts ordering and faster vehicle repair processes, as well as faster estimate preparation for damage repair including replacement parts, and faster insurance processing claims for repairing the scope of the damage, saving time to automotive shops and insurance adjustors. In addition, historical data stored in a database including visualization data, repair protocol data, vehicle identification data, parts identification data, and repair result data, can be used to determine the parts needed for vehicle repair. The historical data include all repairs to vehicles of the same make, model, year, etc. for which the system has been utilized, including all images, measurements, purchases, and repair protocols for each vehicle.

Figure 20:
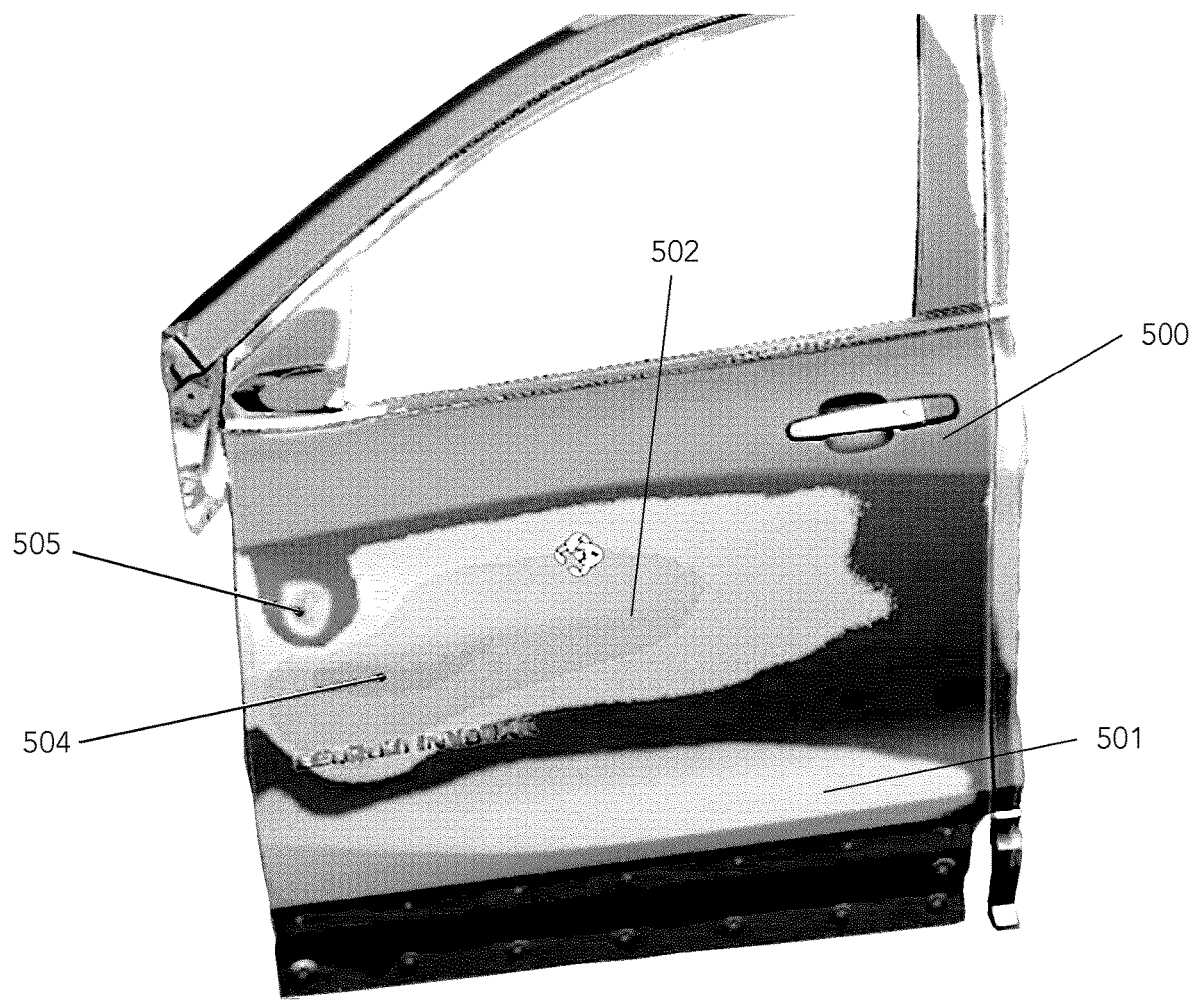
FIG. 20 is an illustration of a heatmap of a vehicle door representing a point cloud deviation in a damaged vehicle.

FIG. 20 is an illustration of a heatmap of a vehicle door representing a deviation resulting from vehicle damage. A 3D scan of a vehicle door was collected using a 3D laser scanner to collect a point cloud representation of the vehicle door. The 3D scan of the vehicle door was overlaid onto the point cloud for a vehicle standard vehicle door of the same year, make and model. The near neighbor distance ratio (NNDR) was used to match the two 3D files together and overlay them. In the case of a heat map for comparing the two files for damage assessment, the damaged file is matched to the undamaged vehicle source file. All points within the two point clouds that match closely are merged together to show one surface area. All other points within the point cloud that do not match the vehicle source file points are isolated by the system and expressed as a color. The colors of the heatmap are varying in degree and show a different color based on specific measurements set out by the system. For example, the matching points within the point clouds will show as a base color 500 specified by the system, and any differentiating points within a certain predetermined set of measurements will show as a different color, for example the light color 501 shows any points in the merged point cloud that differentiate from the undamaged source file between 0 and 1 mm. The darker color 502 will show as a different color and may represent a measurement set of between 1 and 2 mm. Many colors can represent many sets of differentiating scales of measurements depending on the parameters set out by the system. Each color can represent a measurement between a set deviation from the OEM standard. The user can click on any area of the vehicle image overlay heatmap and the system will populate a quantified measurement of difference from the vehicle standard file. For example, the user can mouseover a pointer at first damaged locus 504 or second damages locus 505 to choose a point on the point cloud overlay and a quantified measurement can be populated and displayed representing the difference of the scanned point cloud to the vehicle standard file. Likewise, the user is able to choose a different area of the image overlay heatmap that is represented by a different color to populate a quantified difference of points within the point cloud heatmap. This is useful to show the measured differences of deviation in the damaged vehicle.

All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A computer-implemented method for assessing damage to a vehicle, the method comprising:
    capturing a 3D point cloud of a damaged vehicle and its damaged components with a 3D scanner;
    comparing the 3D point cloud of the damaged vehicle to a baseline 3D file of an original equipment manufacturer (OEM) standard vehicle of the same type;
    identifying a site of vehicle damage on the damaged vehicle based on the comparison of the captured 3D point cloud of the damaged vehicle to the baseline 3D file by identifying a set of deviating points within the 3D point cloud of the damaged vehicle that deviate from the baseline 3D file of the OEM standard vehicle;
    quantifying a deviation of the identified set of deviating points on a x,y,z, plot based on location of points in the 3D point cloud of the damaged vehicle at the site of vehicle damage compared to the OEM standard;
    displaying, on a user interface, an image overlay of the captured 3D point cloud of the damaged vehicle and the baseline 3D OEM standard vehicle and identifying points within the scanned point cloud of the damage vehicle that are beyond a predetermined threshold of deviation from the OEM standard vehicle; and
    selecting, using a graphical user interface, specific points on the 3D point cloud of the damaged vehicle and the baseline 3D file to isolate a measured and angular difference of the specific points.

2. The method of claim 1, wherein the baseline 3D file of the OEM vehicle of the same type is a point cloud file.

3. The method of claim 1, wherein the 3D scanner uses LASER triangulation 3D scanning technology, structured light 3D scanning technology, modulated light 3D scanning technology, contact-based 3D scanning technology, LASER pulse-based 3D scanning technology, time-of-flight 3D laser scanning technology, or laser-based 3D scanning technology.

4. The method of claim 1 wherein the 3D point cloud of the damaged vehicle is accurate to less than 2 mm.

5. The method of claim 1, further comprising matching the identified site of vehicle damage to a previously damaged vehicle in a damaged vehicle database and importing at least one of a repair estimate and a repair procedure for the previously damaged vehicle.

6. The method of claim 5, wherein the repair estimate comprises a listing of one or more parts for replacement, part repair labor time, part replacement labor time, paint cost, coating cost, refinishing labor time, paint or coating dry time, disposal cost, and administrative cost.

7. The method of claim 5, wherein the repair procedure provides one or more angular realignment, applied force, or applied force profile, for applying force at a tool anchoring location.

8. The method of claim 1, wherein comparing the captured 3D composite file of the damaged vehicle and the baseline 3D composite file is executed by one or more convoluted neural networks connected to a processing system.

9. The method of claim 1, wherein comparing the captured vehicle 3D point cloud to a baseline 3D file of an original equipment manufacturer (OEM) standard vehicle of the same type uses a Nearest Neighbor (NN) algorithm or a Nearest Neighbor Distance Ratio (NNDR) algorithm.

10. The method of claim 1, wherein comparing the 3D point cloud of the damaged vehicle and the baseline 3D file capture at least one of curvature, smoothness, and geometrical edge similarities.

11. The method of claim 1, wherein comparing the 3D point cloud of the damaged vehicle to a baseline 3D file comprises matching the damaged vehicle and baseline vehicle by one or more of vehicle model, vehicle year, vehicle make, and vehicle features.

12. The method of claim 1, wherein the 3D point cloud of the damaged vehicle is displayed in a first color and the baseline 3D file of OEM standard vehicle in a second color.

13. The method of claim 1, wherein displaying the image overlay comprises displaying the set of differentiating points and deviation distance on the x,y,z, plot.

14. The method of claim 1, further comprising displaying the image overlay as a heatmap, where each color represents a varying degree of deviation of the 3D point cloud of the damaged vehicle to the baseline 3D file of the OEM standard vehicle.

15. A system for isolating vehicle damage on a damaged vehicle comprising:
    a 3D scanner capable of capturing a point cloud of a damaged vehicle and its components to provide a 3D point cloud image of the damaged vehicle;
    an original equipment manufacturer (OEM) vehicle database comprising a plurality of baseline 3D files of undamaged vehicles identified by vehicle model, vehicle year, and vehicle make;
    a processor for storing and processing information relating to the 3D point cloud of the damaged vehicle and baseline 3D file to:
        compare the captured vehicle 3D point cloud of the damaged vehicle to a baseline 3D file of an OEM standard vehicle of the same vehicle model, vehicle year, and vehicle make from the OEM vehicle database;
        identify, based on the compared 3D point cloud of the damaged vehicle to the baseline 3D file of the OEM standard vehicle, a plurality of differentiating points between the 3D point cloud of the damaged vehicle and the baseline 3D file of the OEM standard vehicle;

quantify a deviation of the identified set of deviating points on a x,y,z, plot based on location of points in the 3D point cloud of the damaged vehicle at the site of vehicle damage compared to the OEM standard; and overlay the captured 3D point cloud of the damaged vehicle and the baseline 3D file to create an image overlay; and a graphical user interface for displaying the image overlay of the 3D point cloud of the damaged vehicle and the baseline 3D file and deviating points within the scanned point cloud of the damage vehicle that are beyond a predetermined threshold of deviation from the OEM standard and selecting specific points on the 3D point cloud of the damaged vehicle and the baseline 3D file to isolate a measured and angular difference of the specific points.

16. The system of claim 15, wherein the processor allows the image overlay on the user interface to be manipulated in 360 degrees and zoomed in and out.

17. The system of claim 15, further comprising a parts database comprising a parts list mapped to particular areas of damage on the damaged vehicle, and wherein the processor generates a parts list for repairing the damaged vehicle.

18. The system of claim 15, further comprising a damaged vehicle database, wherein the processor matches the 3D point cloud of the damaged vehicle to a previously damaged vehicle of the same type, the damaged vehicle database comprising at least one of a repair estimate and a repair procedure for the previously damaged vehicle.

19. The system of claim 15, wherein the 3D scanner is one or more of a LASER triangulation 3D scanner, structured light 3D scanner, time-of-flight 3D laser scanner, modulated light 3D scanner, contact-based 3D scanner, LASER pulse-based 3D scanner, and other laser-based 3D scanner.

20. The system of claim 15, wherein the predetermined threshold of difference is less than 2 mm.

* * * * *